US011283684B2

United States Patent
Li et al.

(10) Patent No.: US 11,283,684 B2
(45) Date of Patent: Mar. 22, 2022

(54) NETWORK SLICE DEPLOYMENT METHOD AND APPARATUS

(71) Applicant: Huawei Technologies Co., Ltd., Shenzhen (CN)

(72) Inventors: Zhuoming Li, Xi'an (CN); Hongxing Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/901,195

(22) Filed: Jun. 15, 2020

(65) Prior Publication Data

US 2020/0313969 A1 Oct. 1, 2020

Related U.S. Application Data

(63) Continuation of application No. PCT/CN2019/080026, filed on Mar. 28, 2019.

(30) Foreign Application Priority Data

Mar. 29, 2018 (CN) .......................... 201810274372.1

(51) Int. Cl.
*G06F 15/16* (2006.01)
*G06F 9/54* (2006.01)
(Continued)

(52) U.S. Cl.
CPC ........ *H04L 41/0893* (2013.01); *G06F 9/5077* (2013.01)

(58) Field of Classification Search
CPC ........... H04L 47/2408; H04L 41/0893; H04W 16/02; G06F 9/5077
(Continued)

(56) References Cited

U.S. PATENT DOCUMENTS 9,660,929 B1 5/2017 Herzog
10,742,522 B2* 8/2020 Senarath ............... H04L 45/302
(Continued)

FOREIGN PATENT DOCUMENTS

CN 104253767 A 12/2014
CN 105791175 A 7/2016
(Continued)

OTHER PUBLICATIONS

ETSI GR NFV-EVE 012, V3. 1. 1, "Network Functions Virtualisation (NFV) Release 3; Evolution and Ecosystem; Report on Network Slicing Support with ETSI NFV Architecture Framework," Dec. 21, 2017, 35 pages.
(Continued)

*Primary Examiner* — Hamza N Algibhah
(74) *Attorney, Agent, or Firm* — Conley Rose, P.C.

(57) ABSTRACT

A network slice deployment method and an apparatus, where the method includes: obtaining, by a network slice management function (NSMF) network element, network slice requirement information, where the network slice requirement information includes a service requirement that needs to be implemented by a to-be-deployed network slice instance (NSI); determining a network service deployment (NSD) template and network function information that correspond to the service requirement; and generating a network functions virtualization (NFV) deployment policy for performing network functions virtualization deployment of the NSI.

22 Claims, 12 Drawing Sheets

(51) Int. Cl.
*H04L 29/06* (2006.01)
*H04L 41/0893* (2022.01)
*G06F 9/50* (2006.01)

(58) Field of Classification Search
USPC .......................................................... 709/226
See application file for complete search history.

(56) References Cited

U.S. PATENT DOCUMENTS

| | | | | |
|---|---|---|---|---|
| 2016/0353465 | A1* | 12/2016 | Vrzic | ................ H04W 28/0247 |
| 2017/0142591 | A1* | 5/2017 | Vrzic | .................. H04L 47/2408 |
| 2017/0339688 | A1 | 11/2017 | Singh et al. | |
| 2019/0036783 | A1* | 1/2019 | Xu | ...................... H04L 41/0233 |
| 2019/0149408 | A1 | 5/2019 | Li | |
| 2020/0329381 | A1* | 10/2020 | Chou | .................... H04W 16/10 |
| 2020/0382386 | A1* | 12/2020 | Narendra | ............ H04L 41/5009 |
| 2021/0092020 | A1* | 3/2021 | Maguire | ................. H04L 41/12 |

FOREIGN PATENT DOCUMENTS

| | | |
|---|---|---|
| CN | 106161049 A | 11/2016 |
| CN | 106685679 A | 5/2017 |
| CN | 107689882 A | 2/2018 |
| CN | 107846313 A | 3/2018 |
| EP | 3249860 A1 | 11/2017 |
| EP | 3252603 A1 | 12/2017 |
| WO | 2017080517 A1 | 5/2017 |
| WO | 2017114219 A1 | 7/2017 |

OTHER PUBLICATIONS

3GPP TR 28.801,V15.0.0, "3rd Generation Partnership Project; Technical Specification Group Services and System Aspects; Telecommunication management; Study on management and orchestration of network slicing for next generation network (Release 15)," Sep. 25, 2017, 78 pages.

3GPP TR 28.800 V15.0.0, "3rd Generation Partnership Project; Technical Specification Group Services and System Aspects; Telecommunication management; Study on management and orchestration architecture of next generation networks and services (Release 15)," Jan. 2018, 23 pages.

ETSI GR NFV-IFA 023 V3.1.1, "Network Functions Virtualisation (NFV);Management and Orchestration;Report on Policy Management in MANO;Release 3," Jul. 2017, 35 pages.

3GPP TS 28.530 V0.5.1, "3rd Generation Partnership Project; Technical Specification Group Services and System Aspects;Telecommunication management;Management of 5G networks and network slicing;Concepts, use cases and requirements (Release 15)," Mar. 28, 2018, 27 pages.

3GPP TS 28.531 V0.3.1, "3rd Generation Partnership Project; Technical Specification Group Services and System Aspects;Management and orchestration of networks and network slicing;Provisioning;Stage 1 (Release 15)," Mar. 28, 2018, 19 pages.

3GPP TR 28.801 V15.1.0, "3rd Generation Partnership Project; Technical Specification Group Services and System Aspects; Telecommunication management;Study on management and orchestration of network slicing for next generation network(Release 15)," Jan. 2018, 75 pages.

3GPP TS 28.541 V0.1.0, 3rd Generation Partnership Project; Technical Specification Group Services and System Aspects; Telecommunication Management;Management and orchestration of networks and network slicing;NR and NG-RAN Network Resource Model (NRM);Stage 2 and stage 3 (Release 15), Feb. 2018, 24 pages.

3GPP TS 28.526 V14.1.0, "3rd Generation Partnership Project; Technical Specification Group Services and System Aspects; Telecommunication management;Life Cycle Management (LCM) for mobile networks that include virtualized network functions;Procedures(Release 14)," Mar. 28, 2018, 38 pages.

ETSI GS NFV-IFA 014 V2.1.1, "Network Functions Virtualisation (NFV); Management and Orchestration;Network Service Templates Specification," Oct. 2016, 35 pages.

ETSI GS NFV-IFA 013 V2.4.1, Network Functions Virtualisation (NFV) Release 2;Management and Orchestration;Os-Ma-Nfvo reference point—Interface and Information Model Specification, Feb. 2018, 151 pages.

* cited by examiner

NETWORK SLICE DEPLOYMENT METHOD AND APPARATUS

CROSS-REFERENCE TO RELATED APPLICATIONS

This application is a continuation of International Patent Application No. PCT/CN2019/080026, filed on Mar. 28, 2019, which claims priority to Chinese Patent Application No. 201810274372.1, filed on Mar. 29, 2018. The disclosures of the aforementioned applications are hereby incorporated by reference in their entireties.

TECHNICAL FIELD

This application relates to the field of information technologies, and in particular, to a network slice deployment method and an apparatus.

BACKGROUND

In network functions virtualization (NFV), a general-purpose hardware device and a virtualization technology are used to carry a function of a dedicated device in a conventional network, to reduce high costs of deploying the dedicated device. Software is not bound to proprietary hardware, such that a network device function no longer depends on dedicated hardware. In addition, features of cloud computing are utilized, such that resources can be fully and flexibly shared, a new service can be rapidly developed and deployed, and automatic deployment, flexible scaling, fault isolation, self-healing, and the like are performed based on an actual service requirement. In an NFV architecture, a party that receives an instantiation request and that instantiates a corresponding service (deploys a service) based on the request is referred to as a virtualization service provider (briefly referred to as a service provider), and a party that initiates the instantiation request is referred to as a service requester.

In NFV, a virtualized network service (NS) may be, for example, an Internet Protocol (IP) multimedia subsystem (IMS) network service or an evolved packet core (EPC) service. One NS may include several virtualized network function (VNF) modules, which are also referred to as virtualized network elements. During virtualization deployment of an NS, the service requester first needs to submit a network service descriptor (NSD) to the service provider. The network service descriptor is also referred to as an NS deployment template, and mainly includes topology structure information for describing the network service and a VNF descriptor (VNFD) of each VNF included in the network service. In the topology structure information, virtualized connection information such as a virtual link descriptor (VLD) is used to describe a connection between the VNFs. A VNFD is description information of a VNF and is also referred to as a VNF deployment template.

In other approaches, when a customer subscribes to a network slice instance (NSI), a network slice management function entity prepares a network slice template (NST) in advance. To support a particular type of service application and meet differentiated requirements of different customers within a particular range, the NST also provides some creation options for creating the NSI. For example, if one NST can support several types of similar service applications, a corresponding NSD includes several NS deployment flavours (DF), and each type of NS DF corresponds to a service application type. Similarly, a VNFD in the NSD may also include several deployment flavours, and each VNFD DF corresponds to a network function attribute. During deployment of a network slice instance, theoretically, the creation options provided by the NST are possible combinations of all the NS DFs and all the VNFD DFs. These combination options are listed in the NST for selection during slice instance deployment, and are referred to as NSD DFs.

According to the foregoing method, all DFs of the corresponding NSD need to be listed in the NST. However, if the NST supports a plurality of types of similar service applications, a corresponding NSD includes a plurality of types of NS DFs. Further, if there is a relatively large quantity of network elements in a network, and each network element further has a plurality of VNFD DFs, there may be a very large quantity of NSD DFs in the NST, resulting in a quite complex design and relatively difficult maintenance of the NST.

SUMMARY

Embodiments of this application provide a network slice deployment method, to resolve a technical problem of a complex design and relatively difficult maintenance of an NST.

An NSD DF in the embodiments of this application may be various differentiated network features to be implemented during NFV deployment performed using an NSD. Differences between the network features may be reflected in network functions constituting a network, a topological relationship (such as a connection relationship or connection attribute information) between the network functions, a quantity of network functions, a network function requirement, and the like. This is not specifically limited.

According to a first aspect, an embodiment of this application provides a network slice deployment method, where the method may be performed by an NSMF network element. The method includes: obtaining network slice requirement information, where the network slice requirement information includes a service requirement that needs to be implemented by a to-be-deployed network slice instance (NSI); determining an identifier of a network service deployment (NSD) template and network function information that correspond to the service requirement, where the network function information corresponding to the service requirement includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement. The method further includes generating a network functions virtualization (NFV) deployment policy for performing NFV deployment of the NSI, where the NFV deployment policy includes the NSD corresponding to the service requirement or the identifier of the NSD, and a rule that needs to be satisfied for performing network service instantiation based on the NSD. The rule that needs to be satisfied for the network service instantiation includes any one or a combination of the following: an identifier or identifiers of one or more virtualized network functions (VNFs) included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD.

It can be learned from the foregoing content that the NSMF network element generates the NFV deployment policy based on the network slice requirement information. In comparison with other approaches in which a deployment flavour meeting a customer order needs to be selected directly from all deployment flavours of an NSD that are listed in an NST, in the foregoing manner, it is unnecessary to map all the deployment flavours of the NSD in the NST to parameter combinations in the customer order. In this way, the NST is decoupled from a deployment flavour of the NSD and a deployment flavour of the VNFD, thereby greatly simplifying a design of the NST and reducing maintenance difficulty.

In a possible design, determining an identifier of an NSD corresponding to the service requirement and network function information corresponding to the service requirement includes: determining a network slice template (NST) matching the service requirement, where the NST includes the NSD corresponding to the service requirement or the identifier of the NSD, and the network function information corresponding to the service requirement; or separately determining the NSD corresponding to the service requirement and an NST matching the service requirement, where the NST includes the network function information corresponding to the service requirement, and in this case, the NST may not include the NSD corresponding to the service requirement or the identifier of the NSD.

In a possible design, the identifier or identifiers of the one or more VNFs included in the NSD are obtained based on the one or more network functions corresponding to the service requirement, the connection relationship between the plurality of VNFs included in the NSD is obtained based on the connection relationship between the plurality of network functions corresponding to the service requirement, the attribute information of the connection between the plurality of VNFs included in the NSD is obtained based on the attribute information of the connection between the plurality of network functions corresponding to the service requirement, and the rule that needs to be satisfied by each parameter in the VNFD used by each of the one or more VNFs included in the NSD is obtained based on the requirement or requirements of the one or more network functions corresponding to the service requirement.

In a possible design, the identifier or identifiers of the one or more VNFs included in the NSD are obtained based on the one or more network functions corresponding to the service requirement, and is or are an identifier or identifiers of one or more VNFs used when network virtualization deployment of the one or more network functions in the NST that correspond to the service requirement is performed. The identifier or identifiers of the VNF or VNFs may be alternatively determined based on a connection end point (namely, a particular network function) included in information about the connection relationship between the plurality of network functions corresponding to the service requirement.

In a possible design, the connection relationship between the plurality of VNFs included in the NSD is obtained based on the connection relationship between the plurality of network functions corresponding to the service requirement, and is a network connection between VNFs that needs to be established during network virtualization deployment, for carrying a service connection between the plurality of network functions in the NST that correspond to the service requirement.

In a possible design, the attribute information of the connection between the plurality of VNFs included in the NSD is obtained based on the attribute information of the connection between the plurality of network functions corresponding to the service requirement, and the attribute information is a required attribute of the network connection between the VNFs that needs to be established during network virtualization deployment, for meeting an attribute requirement of the service connection between the plurality of network functions in the NST that correspond to the service requirement. The attribute information of the connection between the plurality of VNFs may be alternatively determined based on a requirement of a network function corresponding to the service requirement. For example, the attribute information of the connection between the VNFs after the deployment is determined based on performance and capacity requirements of two network functions that serve as connection end points.

In a possible design, the rule that needs to be satisfied by each parameter in the VNFD used by each of the one or more VNFs included in the NSD is each parameter that should be used for deploying the VNF or the VNFs to deploy a network function that is in the NST, that has an attribute such as a specific capacity, specific performance, or a specific function feature, and that corresponds to the service requirement.

In a possible design, the method further includes sending the requirement or requirements of the one or more network functions corresponding to the service requirement to a network function management function NFMF network element.

In this way, the NSMF network element may not have a function of the NFMF network element. In other words, in implementation, the NSMF network element and the NFMF network element are separately disposed.

In a possible design, after generating an NFV deployment policy, the method further includes: obtaining, based on the NSD corresponding to the service requirement or the identifier of the NSD, deployment flavours of the NSD; and selecting, from the deployment flavours of the NSD based on the rule that needs to be satisfied for the network service instantiation, a deployment flavour that satisfies the rule that needs to be satisfied for the network service instantiation.

In this way, after determining the NFV deployment policy, the NSMF network element directly selects, from the obtained deployment flavours of the NSD based on the NFV deployment policy, a deployment flavour that satisfies the NFV deployment policy. In this case, the NSMF network element has both a function of a policy administration point (PAP) and a function of a policy function (PF).

In a possible design, after generating an NFV deployment policy, the method further includes sending the NFV deployment policy to a policy function network element.

In this case, the NSMF network element has a function of a PAP, and sends the generated NFV deployment policy to the policy function network element. The policy function network element implements a function of a PF.

According to a second aspect, an embodiment of this application provides a network slice deployment method, where the method includes: receiving an NFV deployment policy sent by a network slice management function (NSMF) network element, where the NFV deployment policy includes an NSD or an identifier of the NSD, and a rule that needs to be satisfied for performing network service instantiation based on the NSD, and the rule that needs to be satisfied for the network service instantiation includes any one or a combination of the following: an identifier or identifiers of one or more virtualized network functions (VNFs) included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD. The method further includes obtaining deployment flavours of the NSD based on the NSD or the identifier of the NSD; and selecting, from the deployment flavours of the NSD based on the rule that needs to be satisfied for the network service instantiation, a deployment flavour that satisfies the rule that needs to be satisfied for the network service instantiation.

It can be learned from the foregoing content that the NSMF network element generates the NFV deployment policy based on network slice requirement information, and sends the NFV deployment policy to the policy function network element, such that the policy function network element can select a deployment flavour based on the NFV deployment policy. In comparison with other approaches in which a deployment flavour meeting a customer order needs to be selected directly from all deployment flavours of an NSD that are listed in an NST, in the foregoing manner, it is unnecessary to map all the deployment flavours of the NSD in the NST to parameter combinations in the customer order. In this way, the NST is decoupled from a deployment flavour of the NSD and a deployment flavour of the VNFD, thereby greatly simplifying a design of the NST and reducing maintenance difficulty.

According to a third aspect, an embodiment of this application provides a network slice deployment method, where the method includes: receiving a requirement and requirements of one or more network functions sent by an NSMF network element; and generating a VNF deployment policy based on the requirement or requirements of the one or more network functions, where the VNF deployment policy includes a rule that needs to be satisfied by each parameter in a VNFD used by each of one or more VNFs.

Herein, the rule that needs to be satisfied by each parameter in the VNFD used by each of the one or more VNFs is a rule that needs to be satisfied by each parameter in a VNFD used in deployment of the requirement or requirements of the one or more network functions. In other words, the one or more VNFs correspond to the one or more network functions.

In a possible design, after generating a VNF deployment policy, the method further includes: sending the VNF deployment policy to a policy function network element; or selecting, based on the VNF deployment policy and from a deployment flavour of the VNFD used by each VNF, a deployment flavour meeting the rule that needs to be satisfied by each parameter.

According to a fourth aspect, an embodiment of this application provides a network slice deployment method, where the method includes: receiving a VNF deployment policy sent by an NFMF network element, where the VNF deployment policy includes a rule that needs to be satisfied by each parameter in a VNFD used by each of one or more VNFs; and selecting, based on the VNF deployment policy and from a deployment flavour of the VNFD used by each VNF, a deployment flavour meeting the rule that needs to be satisfied by each parameter.

According to a fifth aspect, an embodiment of this application provides an NSMF network element, where the NSMF network element includes: an obtaining module configured to obtain network slice requirement information, where the network slice requirement information includes a service requirement that needs to be implemented by a to-be-deployed network slice instance (NSI); a determining module configured to determine a network service deployment (NSD) template and network function information that correspond to the service requirement, where the network function information corresponding to the service requirement includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement. The NSMF network element further includes a processing module configured to generate a network functions virtualization NFV deployment policy for performing NFV deployment of the NSI, where the NFV deployment policy includes the NSD corresponding to the service requirement or an identifier of the NSD, and a rule that needs to be satisfied for performing network service instantiation based on the NSD, and the rule that needs to be satisfied for the network service instantiation includes any one or a combination of the following: an identifier or identifiers of one or more virtualized network functions VNFs included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD.

In a possible design, the determining module is configured to determine a network slice template NST matching the service requirement, where the NST includes the NSD corresponding to the service requirement or the identifier of the NSD and the network function information corresponding to the service requirement.

In a possible design, the identifier or identifiers of the one or more VNFs included in the NSD are obtained based on the one or more network functions corresponding to the service requirement, the connection relationship between the plurality of VNFs included in the NSD is obtained based on the connection relationship between the plurality of network functions corresponding to the service requirement, the attribute information of the connection between the plurality of VNFs included in the NSD is obtained based on the attribute information of the connection between the plurality of network functions corresponding to the service requirement, and the rule that needs to be satisfied by each parameter in the VNFD used by each of the one or more VNFs included in the NSD is obtained based on the requirement or requirements of the one or more network functions corresponding to the service requirement.

In a possible design, the NSMF network element further includes a transceiver module. The transceiver module is configured to send the requirement or requirements of the one or more network functions corresponding to the service requirement to a network function management function (NFMF) network element.

In a possible design, the processing module is further configured to: obtain, based on the NSD corresponding to the service requirement or the identifier of the NSD, deployment flavours of the NSD; and select, from the deployment flavours of the NSD based on the rule that needs to be satisfied for the network service instantiation, a deployment flavour that satisfies the rule that needs to be satisfied for the network service instantiation.

In a possible design, the NSMF network element further includes the transceiver module, where the transceiver module is configured to send the NFV deployment policy to a policy function network element.

According to a sixth aspect, an embodiment of this application provides a policy function network element, where the policy function network element includes: a transceiver module configured to receive an NFV deployment policy sent by an NSMF network element, where the NFV deployment policy includes an NSD or an identifier of the NSD, and a rule that needs to be satisfied for performing network service instantiation based on the NSD. Additionally, the rule that needs to be satisfied for the network service instantiation includes any one or a combination of the following: an identifier or identifiers of one or more virtualized network functions VNFs included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD. The policy function network element further includes a processing module configured to: obtain deployment flavours of the NSD based on the NSD or the identifier of the NSD; and select, from the deployment flavours of the NSD based on the rule that needs to be satisfied for the network service instantiation, a deployment flavour that satisfies the rule that needs to be satisfied for the network service instantiation.

Still another aspect of the embodiments of this application provides a network slice management function (NSMF) network element. The NSMF network element includes: a memory configured to store a software program; and a processor configured to execute the software program that is in the memory, such that the NSMF network element performs the network slice deployment method according to the first aspect.

Still another aspect of the embodiments of this application provides a policy function network element. The policy function network element includes: a memory configured to store a software program; and a processor configured to execute the software program that is in the memory, such that the policy function network element performs the network slice deployment method according to the second aspect.

Still another aspect of the embodiments of this application provides an apparatus. The apparatus has a function of implementing the network slice deployment method according to the first to the fourth aspects. The function may be implemented by hardware by executing corresponding software. In a possible design, the apparatus includes a processor, a transceiver, and a memory. The memory is configured to store a computer executable instruction. The transceiver is configured to implement communication between the apparatus and another communications entity. The processor and the memory are connected using a bus. When the apparatus runs, the processor executes the computer executable instruction stored in the memory, such that the apparatus performs the network slice deployment method according to the first aspect to the fourth aspect.

Still another aspect of the embodiments of this application provides a computer storage medium. The storage medium stores a software program. When the software program is read and executed by one or more processors, the network slice deployment method according to any one of the first aspect to the fourth aspect is implemented.

Still another aspect of the embodiments of this application provides a network functions virtualization (NFV) system, where the NFV system includes a network slice management function (NSMF) network element and a policy function network element. The NSMF network element is configured to: obtain network slice requirement information, where the network slice requirement information includes a service requirement that needs to be implemented by a to-be-deployed network slice instance (NSI); determine a network service deployment (NSD) template and network function information that correspond to the service requirement, where the network function information corresponding to the service requirement includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement. The NSMF is further configured to generate a network functions virtualization (NFV) deployment policy for performing NFV deployment of the NSI, where the NFV deployment policy includes the NSD corresponding to the service requirement or an identifier of the NSD, and a rule that needs to be satisfied for performing network service instantiation based on the NSD. The rule that needs to be satisfied for the network service instantiation includes any one or a combination of the following: an identifier or identifiers of one or more virtualized network functions VNFs included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD; and send the NFV deployment policy to the policy function network element. Additionally, the policy function network element is configured to: receive the NFV deployment policy sent by the NSMF network element; obtain deployment flavours of the NSD based on the NSD or the identifier of the NSD; and select, from the deployment flavours of the NSD, a deployment flavour that satisfies the rule that needs to be satisfied for the network service instantiation.

Still another aspect of the embodiments of this application provides a computer program product including an instruction. When the computer program product runs on a computer, the computer is enabled to perform the network slice deployment method according to either the first aspect or the second aspect.

DESCRIPTION OF EMBODIMENTS

The following describes this application in detail with reference to the accompanying drawings of this specification, and an operation method in a method embodiment may also be applied to an apparatus embodiment.

As various communication services continuously emerge, requirements of different communication services on network performance differ significantly. A concept of network slice is introduced into a 5th-generation (5G) mobile communications system, to meet different requirements of different communication services on network performance. Network slicing means customization of different logical networks on a physical or virtual network infrastructure based on different service requirements. A network slice may be a complete end-to-end network including a terminal device, an access network, a transport network, a core network, and an application server. The network slice can provide a complete communication service and has a particular network capability. The network slice may be alternatively any combination of a terminal device, an access network, a transport network, a core network, and an application server.

The network slice may be created using various technologies, such as network functions virtualization (NFV) and software-defined networking (SDN). In the embodiments of this application, descriptions are provided based only on creation of a network slice through network functions virtualization.

Figure 1A:
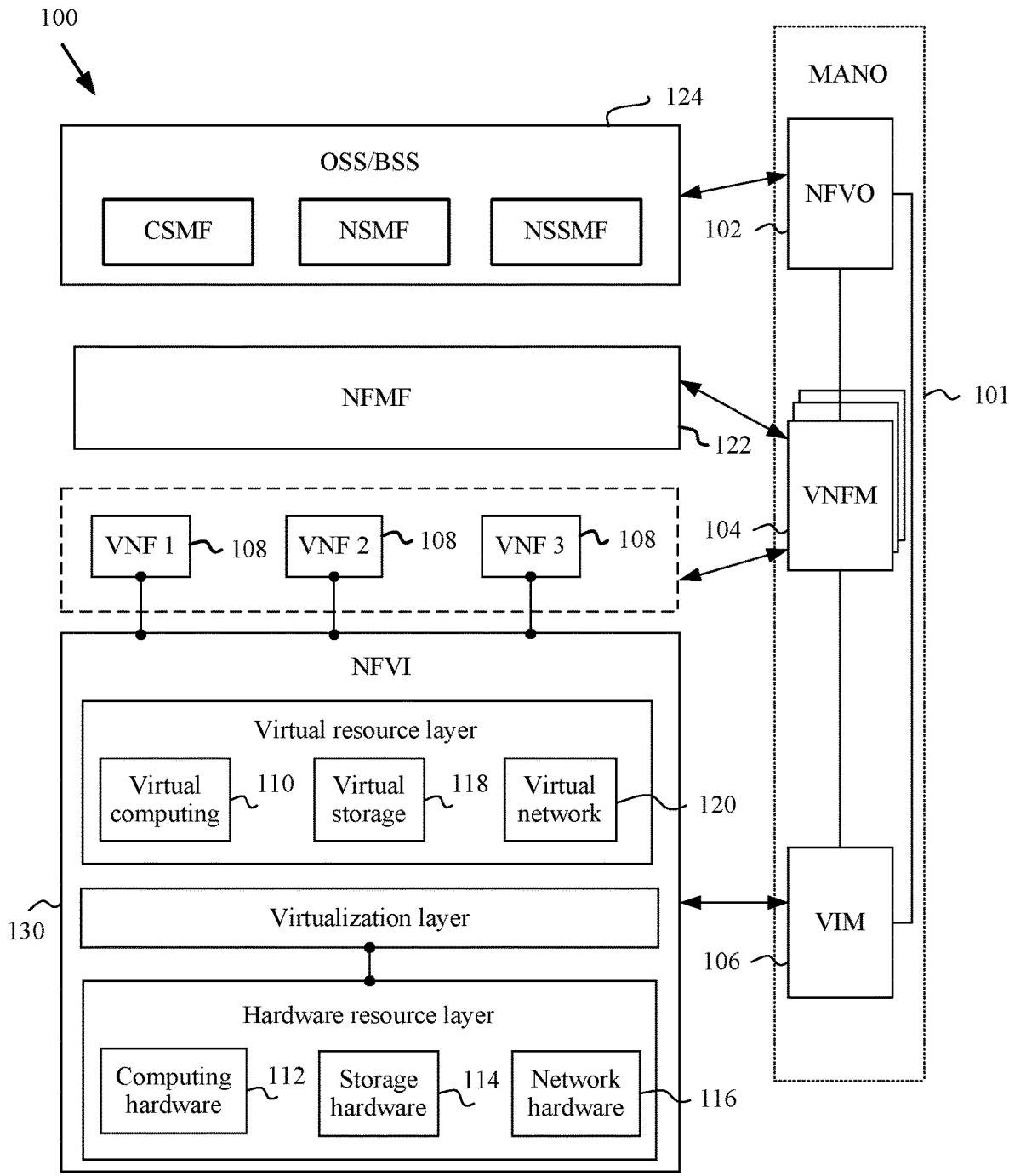
FIG. 1A is a schematic diagram of an overall architecture of an NFV system to which an embodiment of this application is applicable.

FIG. 1A is a schematic diagram of an overall architecture of an NFV system 100 to which an embodiment of this application is applicable. As shown in FIG. 1A, the NFV system 100 includes an NFV management and orchestration (MANO) network element 101, an NFV infrastructure (NFVI) layer 130, a plurality of VNFs 108 (a VNF 1, a VNF 2, and a VNF 3), a network function management function (NFMF) network element 122, and an operation support and management system/business support system (OSS/BSS) 124. The NFV MANO network element 101 includes an NFV orchestrator (NFVO) 102, one or more VNF managers (VNFM) 104, and a virtualized infrastructure manager (VIM) 106.

Further, the OSS/BSS 124 may include a communication service management function (CSMF) network element, a network slice management function (NSMF) network element, and a network slice subnet management function (NSSMF) network element. An end-to-end network slice includes various parts such as a radio access network and a core network, and each part is referred to as a subnet slice. The NSSMF is responsible for managing the subnet slice. The NSMF is responsible for managing the end-to-end slice. The NSSMF is similar to the NSMF, except that the NSSMF receives a service requirement of a subnet and creates a subnet slice instance. If all subnets are provided by one vendor, the NSSMF may not be needed, and the NSMF directly creates a radio access network and a core network. Therefore, the method in the embodiments of this application is applicable to both the NSMF and the NSSMF. In other words, in this embodiment of this application, all descriptions related to the NSMF are also applicable to the NSSMF. This is not specifically limited. The NFVI 130 includes computing hardware 112, storage hardware 114, network hardware 116, a virtualization layer, virtual computing 110, a virtual storage 118, and a virtual network 120.

It should be noted herein that, FIG. 1A is only an example of a possible architecture, and in another possible embodiment, the NSMF network element may directly manage an NF, that is, have a related function of the NFMF network element. In this case, the NFMF network element 122 may not be disposed independently. The foregoing network elements in this embodiment of this application may be physical entity network elements, or may be virtual network elements. This is not limited herein.

For ease of description, in the following, the parts included in the NFV system 100 are represented using their respective abbreviations. For example, the NFV MANO network element is referred to as an NFV MANO for short.

The NFVO 102 is mainly responsible for lifecycle management of a virtualization service, virtual resource allocation and scheduling in a virtual infrastructure and the NFVI, and the like. The NFVO 102 may communicate with one or more VNFMs 104, to execute a resource-related request, send configuration information to the VNFM 104, and collect status information of the VNF 108. In addition, the NFVO 102 may communicate with the VIM 106, to perform resource allocation and/or reservation and exchange virtualization hardware resource configurations and status information with the VIM 106.

The VNFM 104 is mainly responsible for lifecycle management of one or more VNFs, such as instantiating, updating, querying, scaling, or terminating the VNF 108. The VNFM 104 may communicate with the VNF 108, to complete VNF lifecycle management and exchange configurations and status information with the VNF 108. A plurality of VNFMs may exist in an NFV architecture, and are responsible for performing lifecycle management of different types of VNFs.

The VIM 106 controls and manages interactions between the VNF 108 and the computing hardware 112, the storage hardware 114, the network hardware 116, the virtual computing 110, the virtual storage 118, and the virtual network 120. For example, the VIM 106 performs a resource management function, including management of an infrastructure resource, allocation (for example, adding a resource to a virtual container), and performing a function (for example, collecting NFVI fault information). The VNFM 104 and the VIM 106 may communicate with each other, to request resource allocation and exchange virtualized hardware resource configurations and status information.

The NFVI 130 is an NFV infrastructure layer, and includes a hardware component, a software component, or a combination thereof, to set up a virtualized environment, and deploy, manage, and implement the VNF 108. A hardware resource and the virtualization layer are used to provide virtualized resources, such as a virtual machine and a virtual container in another form, for the VNF 108. The hardware resource includes the computing hardware 112, the storage hardware 114, and the network hardware 116. In an implementation, resources of the computing hardware 112 and the storage hardware 114 may be centralized. The virtualization layer in the NFVI may abstract the hardware resource, and decouple the VNF 108 from an underlying physical network layer.

Each VNF 108 runs in one or more virtual containers, and corresponds to a group of network functions belonging to one or more physical devices.

The OSS/BSS 124 supports various end-to-end telecommunications services.

Management functions supported by the OSS include network configuration, service provisioning, fault management, and the like. The BSS processes an order, payment, income, and the like, and supports product management, order management, profit management, and customer management.

The NFV MANO 101 is configured to: allocate, based on an NFV deployment requirement of the network slice management function, an infrastructure resource required by a network slice; deploy a virtual network function on a virtualized infrastructure; and complete a network connection between network function entities.

The CSMF is responsible for sending a network slice order request to the network slice management function based on a communication service requirement of a customer. After a network slice instance is created, the CSMF is further responsible for managing a communication service carried in the network slice instance.

The NSMF is responsible for managing an entire lifecycle, such as creation, activation, operation, deactivation, and deletion, of a network slice instance. The NSMF accepts a network slice order of a customer, and drives, based on a stored network slice template, a virtualization orchestration and management function entity and a slice control function entity to create a network slice instance.

Considering that network function entities in a network slice are from different vendors, the NFMF 122 may indirectly manage these network function entities using NFMF network elements of the vendors.

Figure 1B:
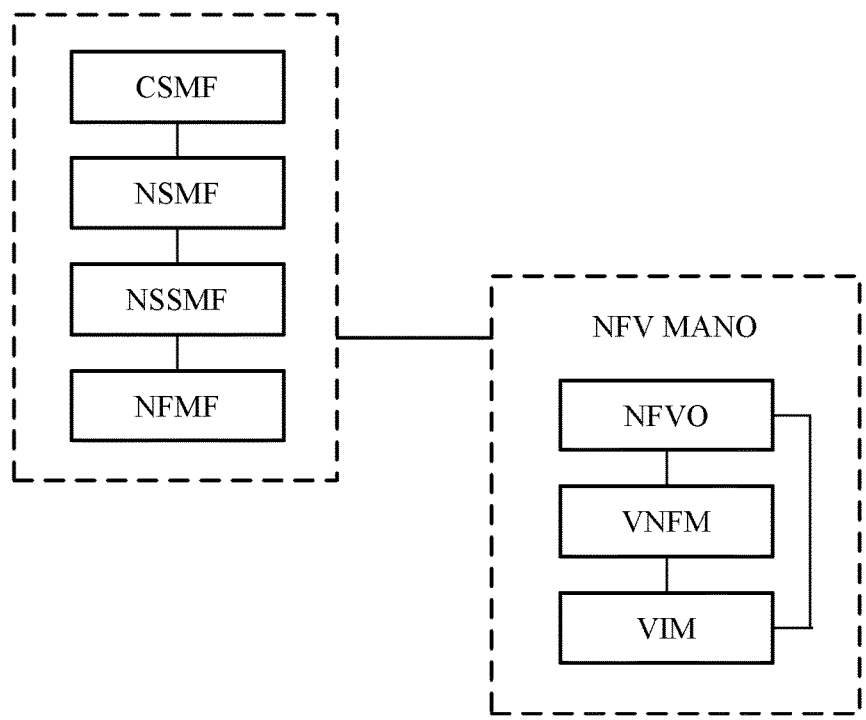
FIG. 1B is a schematic diagram of architectures and interfaces of a network slice management function and an NFV management and orchestration (MANO) network element.

The overall architecture of the NFV system is described above. According to a related protocol of the 3rd generation partnership project (3GPP), the NSMF network element implements NFV deployment of a network slice instance using an interface between the NSMF network element and the NFVO network element of the NFV MANO. FIG. 1B is a schematic diagram of architectures and interfaces of a network slice management function and an NFV MANO.

In application, the NSMF network element and an NFMF network element may not be independent entities, but each serves as a part of the operation and maintenance support system (OSS). In this embodiment of this application, the NSMF network element and the NFMF network element (optional) may be collectively referred to as a policy management network element. The policy management network element is mainly responsible for generating an NFV deployment policy. An NFVO network element and a VNFM network element (optional) may be collectively referred to as a policy function network element. The policy function network element is mainly responsible for selecting, from deployment flavours of an NSD based on the NFV deployment policy, a deployment flavour that satisfies a rule. The policy management network element may also be referred to as a policy administration point (PAP) or another name. This is not specifically limited. The policy function network element may also be referred to as a policy function (PF) entity or another name. This is not specifically limited.

In another possible embodiment, alternatively, the NSMF or an NSSMF network element may function as the PAP, and the NSSMF network element or the NFMF network element may function as the PF. Alternatively, the NSMF or the NSSMF has both a function of the PAP and a function of the PF. Alternatively, the NFV MANO directly performs NFV deployment based on a deployment flavour, of an NSD, determined using the method in the embodiments of this application. Alternatively, the NSMF or the NSSMF performs NFV deployment based on a deployment flavour, of an NSD, determined using the method in the embodiments of this application. This is not specifically limited in this embodiment of this application.

In other words, in this embodiment of this application, when a network element has the function of the PAP and/or the function of the PF, it may be considered that the network element serves as the PAP and/or the PF.

An NSI is an actually operating logical network and can meet a particular network feature or service requirement. The NSI may be obtained through NST-based instantiation. An NST is a template that is predesigned for a particular type of service and that is used for creating a network slice instance. The NST may include an NSD or an NSD ID used during NFV deployment that needs to be performed for creating the NSI. A complete NSI can provide a complete end-to-end network service. The NSI may include several network slice subnet instances (NSSI) and/or several network functions (NFs). The NSSI may be obtained through network slice subnet template (NSST)-based instantiation.

Based on the architectures illustrated in FIG. 1A and FIG. 1B, a process of a network slice instance deployment method is as follows. The CSMF receives a service requirement of a customer, converts the service requirement into a network slice requirement, and sends the network slice requirement to the NSMF. The NSMF converts the received network slice requirement into a network slice subnet requirement, and sends the network slice subnet requirement to the NSSMF. The NSSMF converts the network slice subnet requirement into a requirement of a to-be-deployed network function instance, and sends the network function instance requirement to the NFV MANO. The NFV MANO allocates a resource on the NFVI and deploys a corresponding VNF instance in a network slice based on the deployment requirement, and connects the VNF instance. Then, the NSMF sends a service configuration script to the NFMF. The NFMF executes a related service configuration command on a VNF of the network slice based on the script, such that a service required in a customer order can operate normally on the slice. In this way, a network slice instance is successfully deployed.

In the foregoing process, the NFV MANO needs to deploy a network service (NS) instance based on a requirement of the NSMF network element. In NFV, a virtualized network service is referred to as an NS. One NS includes a plurality of VNFs and a connection (link) between the VNFs. To deploy an NS on the NFVI, a particular central processing unit (CPU), hard disk, and memory are allocated to a virtual machine, and a software image of a VNF runs on the virtual machine, to form a VNF instance. In addition, a corresponding network link is allocated, to connect VNF instances based on a description of an NSD, thereby finally forming one NS instance.

Figure 2:
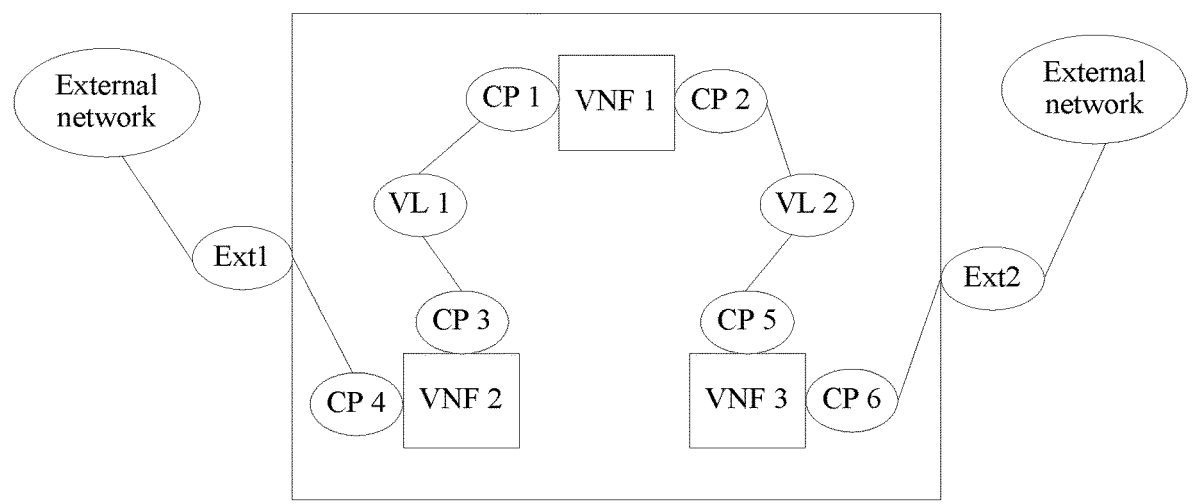
FIG. 2 is a diagram of an NS deployment instance.

FIG. 2 is a diagram of an NS deployment instance. As shown in FIG. 2, the NS instance includes a total of three VNFs, namely, a VNF 1, a VNF 2, and a VNF 3, a total of six connection points (CPs), namely, a CP 1, a CP 2, a CP 3, a CP 4, a CP 5, and a CP 6, and a total of two virtual links (VLs), namely, a VL 1 and a VL 2. The CP 4 and the CP 6 are connected as external connection points to an external network through Ext 1 and Ext2, respectively.

It should be noted that the NS can support nesting. To be more specific, a set of some VNFs constitutes an NS, and then the NS and another NS or VNF constitute an NS with a larger range. When there is a nested NS, an NSD identifier (an NSD ID) of the nested NS may be indexed in an NSD.

Based on different deployment requirements, the NSD includes several NS deployment flavours. In each NS DF, information such as types of VNFs included in the NS, a network connection of the VNFs, and a quantity of each type of VNFs may be described. For a definition of a standard structure of the NS DF, refer to Table 1.

TABLE 1

Definition of a standard structure of the NS DF

| Information element | Information element quantity | Description | Example |
|---|---|---|---|
| Flavour identifier (Flavour ID) | 1 | An identifier of an NS deployment flavour, where the identifier is a serial number or a string name. | |
| Flavour keyword (Flavour key) | 1 | An assurance parameter description of a deployment flavour, where the assurance parameter description may include one or more assurance parameters, and a logical relationship between the assurance parameters. These assurance parameters are indicator parameters that need to be monitored during network operation. | An assurance parameter of an NS of an evolved packet core (EPC) may be described as "calls per second (cps)." |
| List of flavour elements | 1 . . . N | A description of types of NFVs constituting an NS and a quantity of VNF instances. | If an NS instance of a virtual EPC that can ensure 500k cps is used as a deployment flavour, a list of elements of this deployment flavour may be described as follows: virtual mobility management entity (vMME) → two instances virtual serving gateway (vSGW) → two instances virtual packet gateway (vPGW) → one instance |

Figure 3:
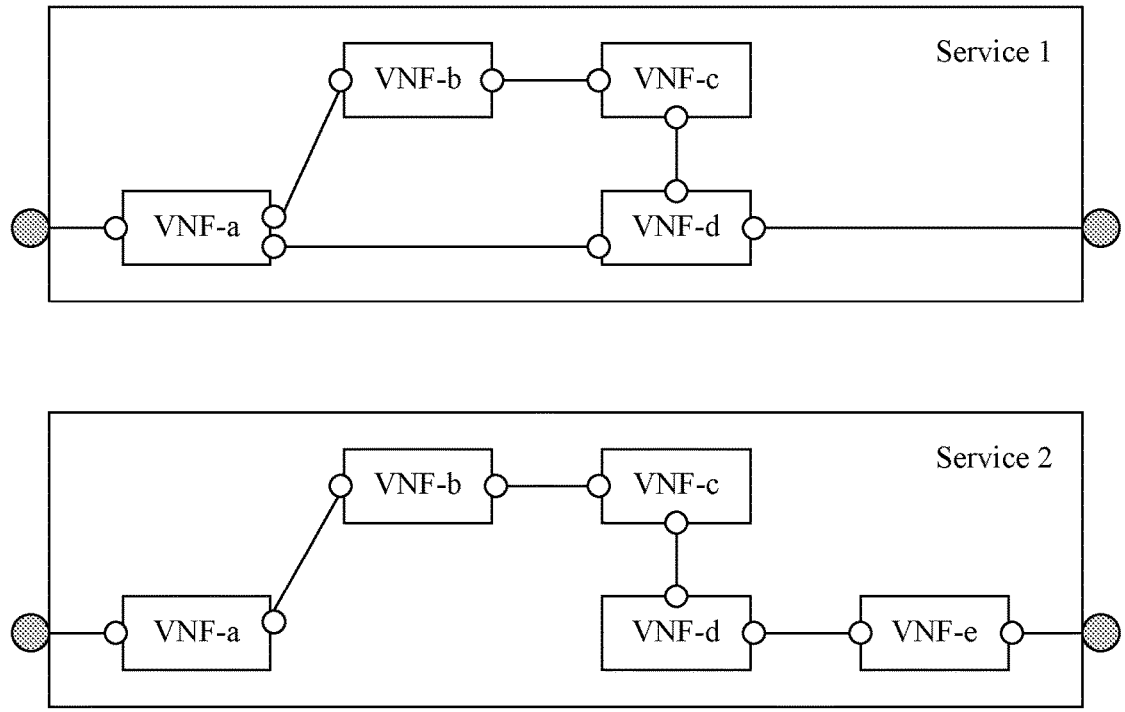
FIG. 3 is a schematic diagram of NSDs corresponding to two services.

For example, an NST supports two types of similar service applications. FIG. 3 is a schematic diagram of NSDs corresponding to the two types of services. When a service 1 is supported, four network functions, a VNF-a to a VNF-d, are needed. When a service 2 is supported, five network functions, a VNF-a to a VNF-e, are needed.

Similarly, a VNFD also includes several DFs. In a VNFD DF, information such as modules constituting a VNF, a network connection between the modules, deployment quantities of the modules, deployment requirements of the modules, and software images and versions of the modules may be described. For a definition of a standard structure of the VNFD DF, refer to Table 2.

TABLE 2

Definition of a standard structure of the VNFD DF

| Information element | Information element quantity | Description | Example |
|---|---|---|---|
| Flavour ID | 1 | An identifier of a deployment flavour of a VNFD, where the identifier is a serial number or a string name. | |
| Flavour key | 1 | An assurance parameter description of a deployment flavour, where the assurance parameter description may include one or more assurance parameters. These assurance parameters are indicator parameters that need to be monitored during VNF operation. | An assurance parameter of a deployment flavour of a packet data network gateway (PGW) may be described as "calls per second (cps)". In this case, the deployment flavour of the PGW may be described as supporting 10k cps. |
| List of hardware constraints (optional) | 0 . . . N | Used to describe constraints on dependency of a deployment flavour on particular hardware. | |
| List of VDU elements | 1 . . . N | Used to describe virtual network function components VNF components (VNFC) constituting a VNF under this deployment flavour, and a requirement that needs to be met by a virtual machine of virtual deployment units (VDUs) for deploying these VNFCs. | Under this deployment flavour, a VNF instance of a PGW includes: a signaling control function VNFC, and a data forwarding VNFC. One VDU is needed when each of the VNFCs is deployed. Virtual machine resource requirements of VDUs of a PGW that can support a deployment flavour of 10k cps are as follows: A VDU for deploying the signaling control VNFC needs three virtual machines (VMs), and each VM needs 4 gigabyte (GB) virtual memory, two virtual CPUs, 32 GB virtual disk storage, and the like. A VDU for deploying the data forwarding VNFC needs two virtual machines (VM), and each VM needs 8 GB virtual memory, two virtual CPUs, 64 GB virtual disk storage, and the like. |

Figure 4:
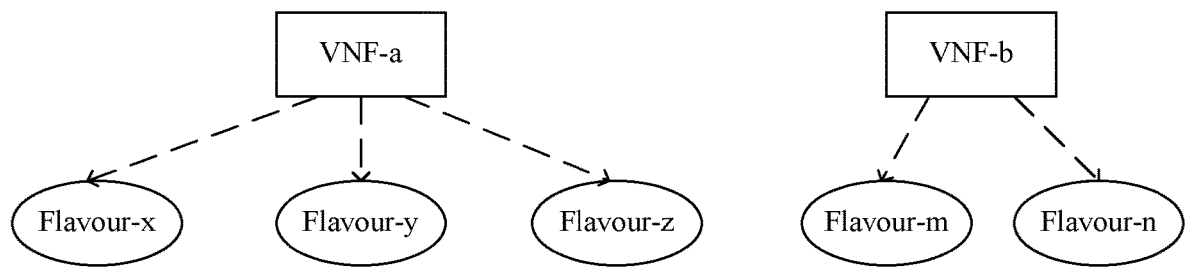
FIG. 4 is a schematic diagram of deployment flavours of a VNF-a and a VNF-b.

For example, if the VNF-a in FIG. 3 has three types of DFs separately supporting different service capacities (flavour-x, flavour-y, and flavour-z), the VNF-b has two types of DFs separately supporting different service capacities (flavour-m and flavour-n), and VMs, from a VM with a minimum capacity to a VM with a maximum capacity, for other VNFs are the same in terms of a quantity of virtual CPUs and amounts of virtual memory and virtual disk storage, only one type of DF is sufficient. FIG. 4 is a schematic diagram of deployment flavours of a VNF-a and a VNF-b.

In this way, after VNFD DFs of the VNFs are combined, there is a total of 12 DFs in an NSD, as shown in Table 3.

TABLE 3

Examples of NSD DFs

| NSD DF | VNF-a | VNF-b | VNF-c | VNF-d | VNF-e |
|---|---|---|---|---|---|
| NSD DF-1 | df-x | df-m | df-c | df-d | \ |
| NSD DF-2 | df-y | df-n | df-c | df-d | \ |
| NSD DF-3 | df-z | df-m | df-c | df-d | \ |
| NSD DF-4 | df-x | df-n | df-c | df-d | \ |
| NSD DF-5 | df-y | df-m | df-c | df-d | \ |
| NSD DF-6 | df-z | df-n | df-c | df-d | \ |
| NSD DF-7 | df-x | df-m | df-c | df-d | df-e |
| NSD DF-8 | df-y | df-n | df-c | df-d | df-e |
| NSD DF-9 | df-z | df-m | df-c | df-d | df-e |
| NSD DF-10 | df-x | df-n | df-c | df-d | df-e |
| NSD DF-11 | df-y | df-m | df-c | df-d | df-e |
| NSD DF-12 | df-z | df-n | df-c | df-d | df-e |

In other approaches, during NST design, all the NSD DFs in the foregoing example are listed, and ranges of parameter combinations in a customer network slice order that can be satisfied by these NSD DFs are determined. Then, the NSD DFs are mapped to the parameter combinations in the customer order. For example, the DF-12 can satisfy access of 1 million narrowband fixed internet of things (IoT) terminals, and the DF-6 can satisfy access of 200000 wideband mobile internet of things terminals with a rate lower than 100 kilometers per hour (km/h). Then, the DF-6 and the DF-12 are mapped to ranges of parameter combinations in the order.

According to this method, an NSMF can select, from the NST based on a network slice order delivered by a user, an NSD ID and an NSD DF that meet a requirement of the customer order, and the NSMF adds the selected NSD ID and NSD DF to a deployment request to be sent to an NFV MANO. The NFV MANO completes deployment based on an NS DF and a VNFD DF. However, listing a correspondence, in the NST, between all the NSD DFs and the parameter combinations in the customer order results in a complex design and relatively difficult maintenance of the NST.

In view of this, the embodiments of this application provide a network slice deployment method, to resolve a technical problem of a quite complex design and relatively difficult maintenance of an NST.

Figure 5:
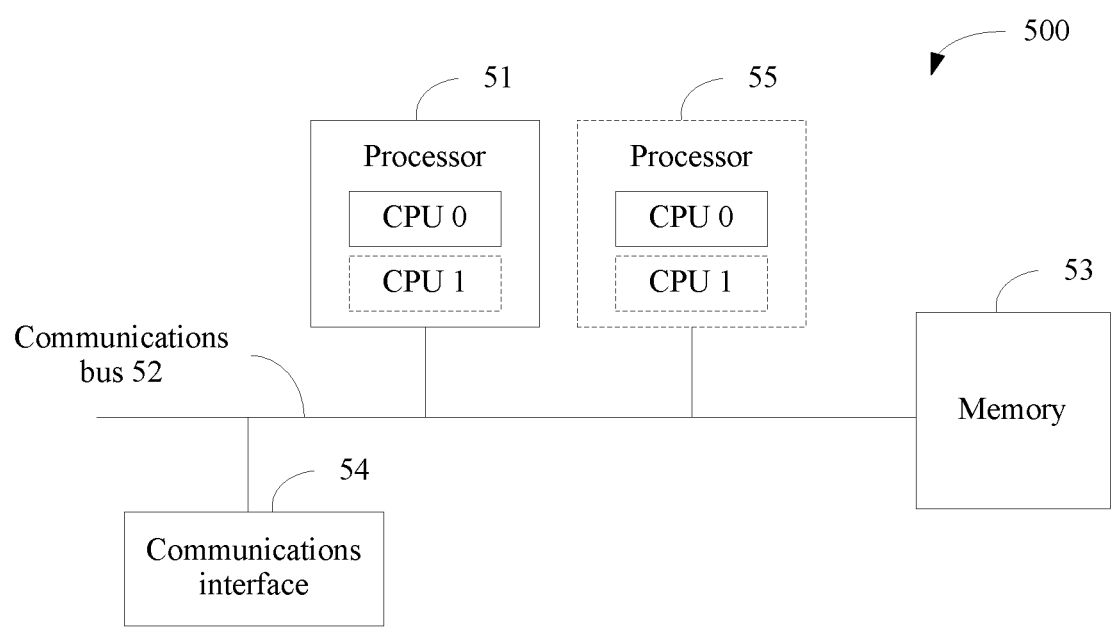
FIG. 5 is a schematic structural diagram of an apparatus according to an embodiment of this application.

FIG. 5 shows an apparatus 500 according to an embodiment of this application. The apparatus 500 includes at least one processor 51, a communications bus 52, a memory 53, and at least one communications interface 54. The apparatus 500 may be any function network element in the embodiments of this application. The apparatus 500 may be configured to perform the network slice deployment method provided in the embodiments of this application.

The processor 51 may be a general-purpose central processing unit (CPU), a microprocessor, an application-specific integrated circuit (ASIC), or one or more integrated circuits that are configured to control program execution of a solution of this application.

The communications bus 52 may include a path for transmitting information between the foregoing components. The communications bus 54 uses any type of apparatus such as a transceiver, to communicate with another device or a communications network, such as an Ethernet, a radio access network (RAN), or a wireless local access network (WLAN).

The memory 53 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another optical disc storage, a disc storage (including a compact disc, a laser disc, an optical disc, a digital versatile disc, a Blu-ray disc, or the like), a magnetic disk storage medium or another magnetic storage device, or any other medium that can be accessed by the apparatus and that can be configured to carry or store expected program code in a form of an instruction or a data structure. However, this application is not limited thereto. The memory may exist independently and is connected to the processor using the bus. Alternatively, the memory may be integrated with the processor.

The memory 53 is configured to store application program code for executing the solution of this application, and the processor 51 controls the execution.

In implementation, in an embodiment, the processor 51 may include one or more CPUs, for example, a CPU 0 and a CPU 1 shown in FIG. 5.

In implementation, in an embodiment, the apparatus 500 may include a plurality of processors, for example, a processor 51 and a processor 55 shown in FIG. 5. Each of these processors may be a single-core (single-CPU) processor, or may be a multi-core (multi-CPU) processor. The processor herein may be one or more devices, circuits, and/or processing cores configured to process data (for example, a computer program instruction).

For example, the apparatus shown in FIG. 5 may be a policy management network element or a component of a policy management network element. The memory of the apparatus shown in FIG. 5 stores one or more software modules. The apparatus shown in FIG. 5 may implement, using the processor executing the program code in the memory, a network slice deployment method performed by the policy management network element in the embodiments of this application.

For example, the apparatus shown in FIG. 5 may be a policy function network element or a component of a policy function network element. The memory of the apparatus shown in FIG. 5 stores one or more software modules. The apparatus shown in FIG. 5 may implement, using the processor executing the program code in the memory, a network slice deployment method performed by the policy function network element in the embodiments of this application.

In the following embodiments, step numbers are merely for convenience of description, and there is no strict execution sequence relationship between steps.

Embodiment 1

Figure 6A:
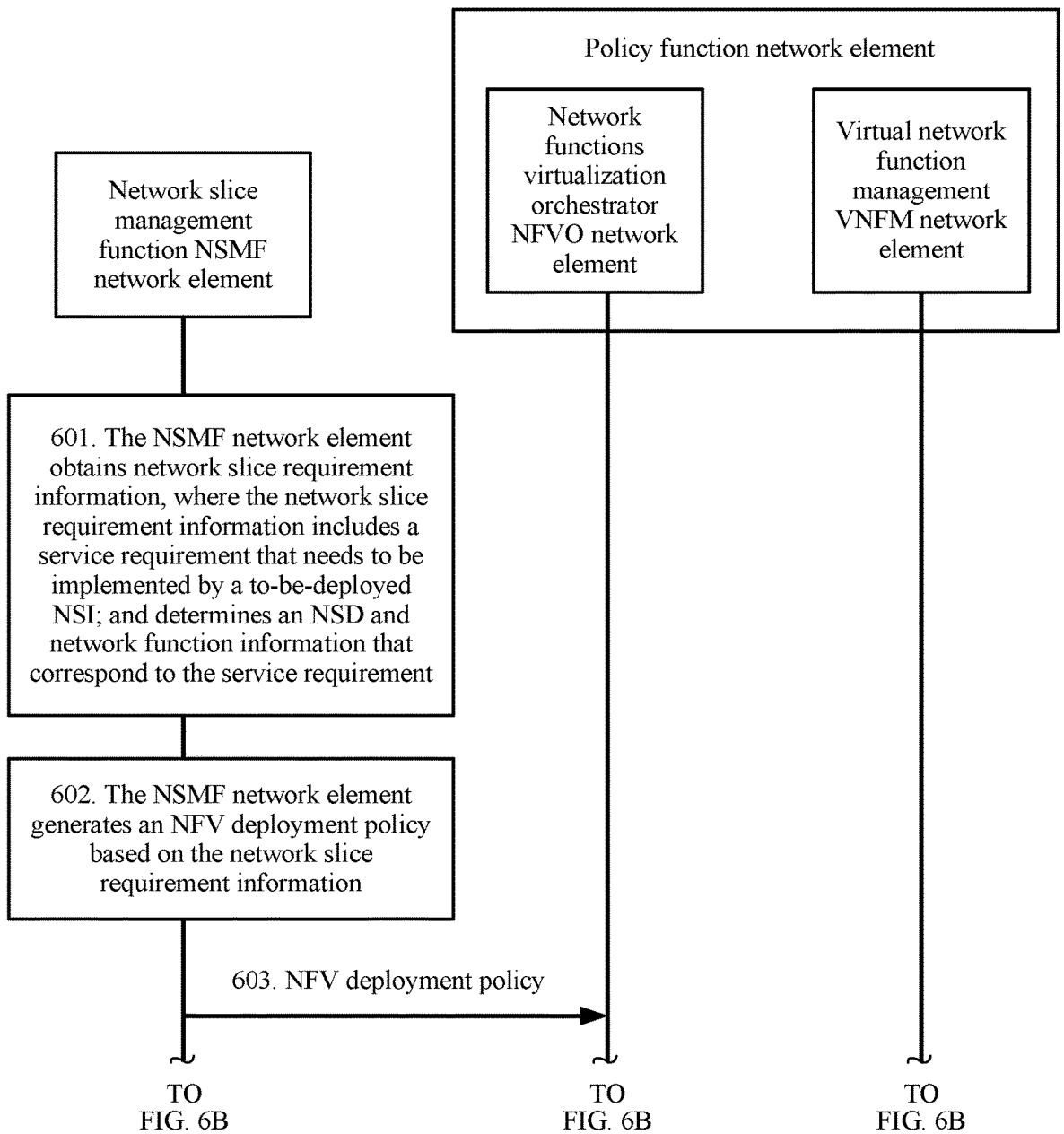
FIG. 6A and FIG. 6B are schematic flowcharts corresponding to a network slice deployment method according to Embodiment 1 of this application.
Figure 6B:
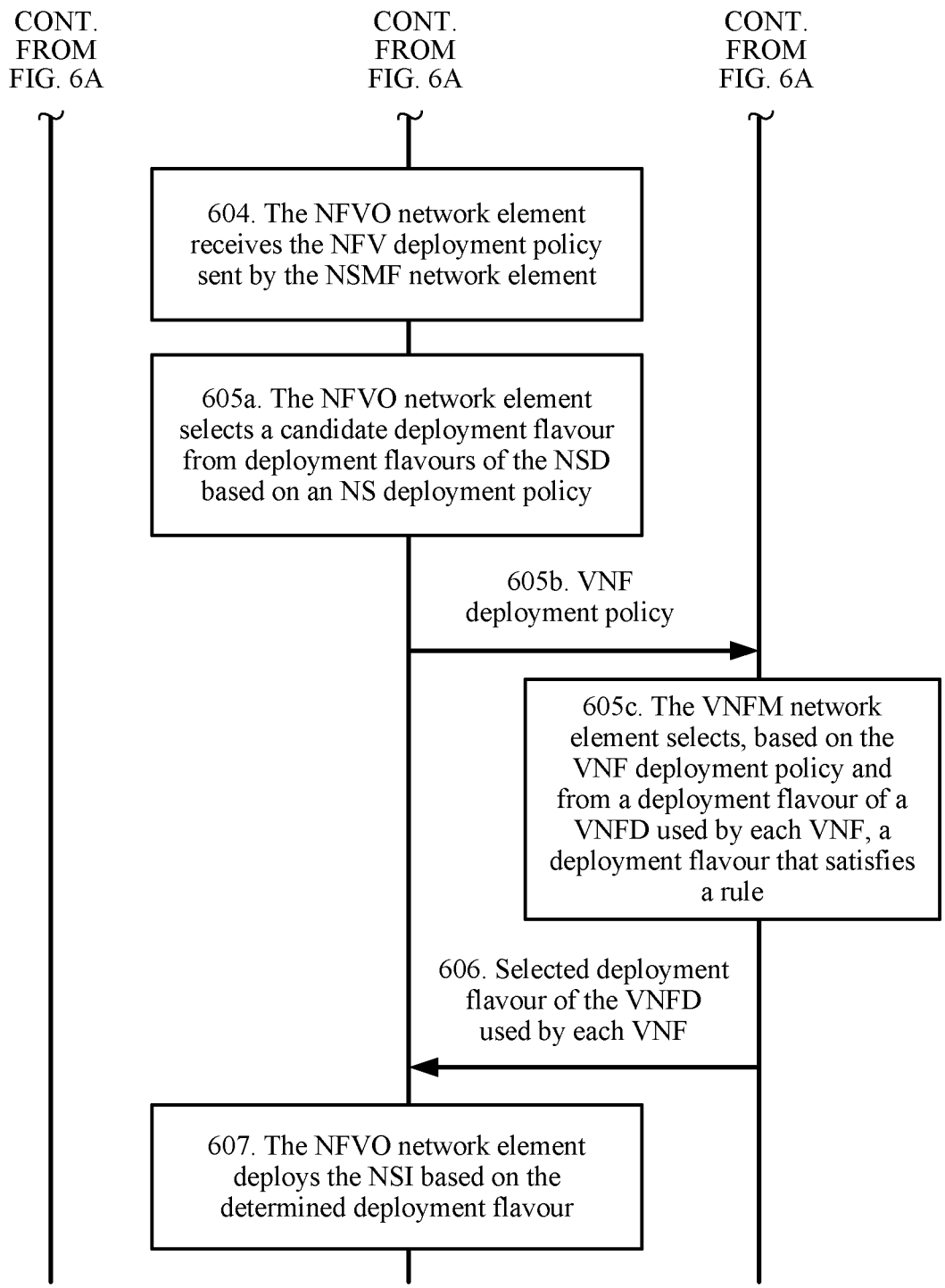

FIG. 6A and FIG. 6B are schematic flowcharts corresponding to a network slice deployment method according to Embodiment 1 of this application. As shown in FIG. 6A and FIG. 6B, the method includes the following steps.

Step 601. An NSMF network element obtains network slice requirement information, where the network slice requirement information includes a service requirement that needs to be implemented by a to-be-deployed NSI, and the NDMF network element determines an NSD and network function information that correspond to the service requirement. The network function information corresponding to the service requirement includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement.

Herein, for example, the NSMF network element receives an NSI deployment order, and obtains the network slice requirement information based on the order.

The service requirement that needs to be implemented by the NSI may include one or more types of requirement information. For example, the service requirement that needs to be implemented by the NSI may include any one or a combination of items listed in Table 4.

In this embodiment of this application, the service requirement that needs to be implemented by the NSI may be selected from a particular range of parameters listed in an NST that are provided to a user when an operator releases a network slice product, or may be specified. In this way, the service requirement that needs to be implemented by the NSI can match a particular NST.

For example, an order requires that a communication service be provided for 20000 shared bicycles in a particular region. In this case, it can be learned that the service requirement that needs to be implemented by the NSI includes a service type (internet of things) and a regional capacity (20000) of the service. Service requirements included in an NST 1, an NST 2, and an NST 3 are shown in Table 5.

TABLE 4

Examples of requirement information

| Requirement information | Explanation of the requirement information |
| --- | --- |
| Service type | The service type may be a service type in a broad sense, such as currently defined enhanced mobile broadband (eMBB), ultra-reliable and low latency communications (URLLC), or mobile IoT (MIoT), or may be a finer-grained service type such as internet of vehicles or augmented reality/virtual reality (AR/VR). |
| Regional capacity of a service | For each type of service, a maximum quantity of users allowed to use the service in a region |
| Maximum allowed bandwidth that can be guaranteed | Maximum network bandwidth guaranteed to be available for allocation to each user |
| Maximum end-to-end network latency that can be ensured | An upper limit of a network transmission latency that can be ensured for transmitting a data packet in a session from a user equipment (UE) to a packet data unit (PDU) of a data network (DN) |
| Maximum allowed terminal movement speed | In a particular region, if a movement speed of UE does not exceed this upper limit, a network can ensure quality of service. |
| Maximum terminal density | A quantity of terminals that are allowed to register with a network in a particular region |
| Reliability level | A reliability level in which a service success probability meets 99.9%, 99.999%, 99.9999%, or the like |
| Supported service continuity mode | Mode 1: An anchor point of a PDU session remains unchanged, ensuring IP continuity. Mode 2: UE releases an anchor point of an original PDU session, and immediately establishes a new PDU session. Mode 3: UE is allowed to establish connections to a same data network simultaneously using a plurality of PDU sessions. |
| Supported service separation level | Whether a service shares a network slice instance with another service, and a network function shared between a network slice instance and another slice instance |
| Supported QoS control mode and parameter | In a 5G network, a service flow is referred to as a quality of service (QoS) flow, and a quality of service attribute is identified using a 5G QoS identifier (5QI). In a Long Term Evolution (LTE) network, a service flow is referred to as an Evolved Packet System (EPS) bearer, and a QoS attribute is described using a QoS class identifier (QCI). |
| Supported service priority level | A QoS assurance priority order of different services in case of network congestion |

TABLE 5

Examples of service requirements that are
met in the NST 1, the NST 2, and the NST 3

| | NST 1 | NST 2 | NST 3 |
|---|---|---|---|
| Service type | Internet of things | Internet of things | Internet of things |
| Regional capacity of a service | Level 1: 10000 to 12000 | Level 1: 15000 to 16000 | Level 1: 18000 to 21000 |
| | Level 2: 12000 to 15000 | Level 2: 16000 to 17000 | Level 2: 21000 to 24000 |
| | | Level 3: 17000 to 18000 | |
| ... | ... | ... | ... |

In Table 5, service types included in the NST 1, the NST 2, and the NST 3 are all internet of things, a regional capacity of a service included in the NST 1 includes two levels: 10000 to 12000 and 12000 to 15000; a regional capacity of a service included in the NST 2 includes three levels: 15000 to 16000, 16000 to 17000, and 17000 to 18000; and a regional capacity of a service included in the NST 3 includes two levels: 18000 to 21000 and 21000 to 24000. In this way, it can be determined that, of the three NSTs, an NST matching the service requirement that needs to be implemented by the NSI is the NST 3.

Further, the NST may further include the NSD corresponding to the service requirement or an identifier of the NSD, and the network function information corresponding to the service requirement. In this way, the NSMF network element can determine, based on the NST matching the service requirement, the NSD and the network function information that correspond to the service requirement. Alternatively, in another possible embodiment, the NSMF network element may directly determine, based on the service requirement, the NSD corresponding to the service requirement and the NST matching the service requirement, where the NST includes the network function information corresponding to the service requirement. In this case, the NST may not include the NSD corresponding to the service requirement or the identifier of the NSD.

Based on the foregoing example, the following further lists content included in the NST 3. Table 6 shows only an example in which the NST 3 includes all the foregoing listed content.

It may be learned from Table 6 that, based on the service requirement that needs to be implemented by the NSI, the NSD corresponding to the service requirement or the identifier of the NSD, and the network function information corresponding to the service requirement may be obtained from the NST.

For example, the one or more network functions corresponding to the service requirement may be network functions such as a radio access network (RAN), a user plane function (UPF) network element, an access and mobility management function (AMF) network element, a session management function (SMF) network element, and an application service (AS). The connection relationship between the plurality of network functions corresponding to the service requirement is used to describe whether there is a link connection between the plurality of network functions, for example, whether there is a link connection between the RAN and the UPF. The attribute information of the connection between the plurality of network functions corresponding to the service requirement is used to describe an attribute of a connection between the plurality of network functions. For example, the connection is a user plane connection or a control plane connection. The connection attribute information needs to be described using attributes of a connection point and a link. The requirement or requirements of the one or more network functions corresponding to the service requirement are used to describe one or more of the following items: a function unit that an NS instance or a VNF instance needs to have, a quantity of instances that needs to be satisfied, a performance indicator parameter, an assurance parameter, and a resource requirement. This is not specifically limited.

Based on the foregoing example in which a communication service is provided for 20000 shared bicycles in a particular region, it is described in the NST that a data connection needs to be established between a VNF-a-type network function supporting this type of service and a VNF-d-type network function supporting this type of service, and a maximum connection quantity of the VNF-d-type network function is not less than 20000, to be more specific, a requirement of the VNF-d-type network function corresponding to the service requirement is [VNF-d.max_session>=20000].

TABLE 6

Example of content included in the NST 3

| Service requirement | One or more network functions corresponding to the service requirement | Connection relationship between a plurality of network functions corresponding to the service requirement | Attribute information of a connection between the plurality of network functions corresponding to the service requirement | Requirements respectively corresponding to the plurality of network functions corresponding to the service requirement | NSD corresponding to the service requirement or identifier of the NSD |
|---|---|---|---|---|---|
| Service type: internet of things | Regional capacity of a service: 18000 to 21000 | RAN, AMF, SMF, and UPF | ... | ... | ... | ... |
| | Regional capacity of a service: 21000 to 24000 | RAN, AMF, SMF, UPF, and AS | ... | ... | ... | ... |

Step 602. The NSMF network element generates an NFV deployment policy for performing NFV deployment of the NSI, where the NFV deployment policy includes the NSD corresponding to the service requirement or the identifier of the NSD, and a rule that needs to be satisfied for performing network service instantiation based on the NSD, and the rule that needs to be satisfied for the network service instantiation includes any one or a combination of the following: an identifier or identifiers of one or more virtualized network functions VNFs included in the NSD, a connection relationship between a plurality of VNFs included in the NSD, attribute information of a connection between the plurality of VNFs included in the NSD, and a rule that needs to be satisfied by each parameter in a VNFD used by each of the one or more VNFs included in the NSD.

The NSD corresponding to the service requirement or the identifier of the NSD included in the NFV deployment policy is an NSD that needs to be used when NFV deployment of the NSI is performed or an identifier of the NSD.

Further, the content illustrated in Table 6 is used as an example. The NST matching the service requirement that needs to be implemented by the NSI includes the one or more network functions corresponding to the service requirement, the connection relationship between the plurality of network functions corresponding to the service requirement, the attribute information of the connection between the plurality of network functions corresponding to the service requirement, and the requirement or requirements of the one or more network functions corresponding to the service requirement. Therefore, the NSMF network element may be configured to: obtain, based on the one or more network functions corresponding to the service requirement, the identifier or identifiers of the one or more VNFs included in the NSD; obtain, based on the connection relationship between the plurality of network functions corresponding to the service requirement, the connection relationship between the plurality of VNFs included in the NSD; obtain, based on the attribute information of the connection between the plurality of network functions corresponding to the service requirement, the attribute information of the connection between the plurality of VNFs included in the NSD; and obtain, based on the requirement or requirements of the one or more network functions corresponding to the service requirement, the rule that needs to be satisfied by each parameter in the VNFD used by each of the one or more VNFs included in the NSD.

For example, if network functions corresponding to the service requirement described above (where the service type is internet of things, and the regional capacity of the service is 20000) is the RAN, the AMF, the SMF, and the UPF, the NSMF network element may learn that the identifiers of the VNFs included in the NSD are VNFa (corresponding to the RAN), VNFb (corresponding to the AMF), VNFc (corresponding to the SMF), and VNFd (corresponding to the UPF). If, in the plurality of network functions corresponding to the service requirement described above (where the service type is internet of things, and the regional capacity of the service is 20000), the RAN is connected to the AMF and the UPF, the AMF is connected to the SMF, and the SMF is connected to the UPF, the NSMF network element may learn that in the VNFs included in the NSD, the VNFa is connected to the VNFb and the VNFd, the VNFb is connected to the VNFc, and the VNFc is connected to the VNFd. That the VNFa is connected to the VNFb and the VNFd may be expressed as follows: [VNF-a in NS.elements_list] and [VNF-d in NS.elements_list] and [VL.connection=(VNF-a.CP2, VNF-d.CP1)].

An implementation process in which the NSMF network element obtains, based on the requirement or requirements of the one or more network functions corresponding to the service requirement, the rule that needs to be satisfied by each parameter in the VNFD used by each of the one or more VNFs included in the NSD may be as follows. The NSMF network element determines, based on the requirement or requirements of the one or more network functions and an implementation specification of a network function in the NST, a rule that needs to be satisfied by each parameter in the VNFD used for deploying the corresponding VNF. The implementation specification of the network function in the NST may be obtained based on an actual specification of a network function of each vendor.

For example, the NSMF network element may determine, based on a service function requirement, a version number of the VNF, included VNF components (VNFC), and virtualization deployment units (VDU) corresponding to these VNFCs. The NSMF network element may further determine a quantity of VDUs in the VNF and the like based on a requirement of an NF. In the foregoing example, based on a service performance specification of the VNF-d and an actual specification of a network function in the NST, the NSMF network element converts a requirement of [VNF-d.max_session>=20000] into [LB_VDU.instance_number>=2] and [UP_VDU.instance_number>=4], and uses [LB_VDU.instance_number>=2] and [UP_VDU.instance_number>=4] as a rule that needs to be satisfied by each parameter in a VNFD used by the VNF-d.

Step 603. The NSMF network element sends the NFV deployment policy to a policy function network element.

Step 604. The policy function network element receives the NFV deployment policy sent by the NSMF network element.

Step 605. The policy function network element obtains deployment flavours of the NSD based on the NSD or the identifier of the NSD, and selects, from the deployment flavours of the NSD based on the rule that needs to be satisfied for the network service instantiation, a deployment flavour that satisfies the rule. Herein, the deployment flavours of the NSD are all deployment flavours comprehensively determined based on a deployment flavour of an NS (referring to the description of FIG. 3) and a deployment flavour of the VNF or the VNFs (referring to the description of FIG. 4), that is, the 12 deployment flavours shown in Table 3.

In this embodiment of this application, the policy function network element may include an NFVO network element and a VNFM network element. In this case, in step 603, the NSMF network element may send the NFV deployment policy to the NFVO network element.

Correspondingly, in step 604, the NFVO network element receives the NFV deployment policy.

All the information included in the NFV deployment policy, such as the NSD that needs to be used when the NFV deployment of the NSI is performed or the identifier of the NSD, the identifier or identifiers of the one or more VNFs included in the NSD, the connection relationship between the plurality of VNFs included in the NSD, and the attribute information of the connection between the plurality of VNFs included in the NSD, is used to perform NS deployment. Therefore, such information may be referred to as an NS deployment policy. Because the rule that needs to be satisfied by each parameter in the VNFD used by each of the one or more VNFs corresponding to the one or more network functions is used to perform VNF deployment, the rule may be referred to as a VNF deployment policy.

Correspondingly, step 605 may include: Step 605*a*. The NFVO network element selects a candidate deployment flavour from the deployment flavours of the NSD based on the NS deployment policy. For example, the NFVO network element may obtain the deployment flavours of the NSD (such as the 12 deployment flavours shown in Table 3) based on the NSD or the identifier of the NSD, and select a deployment flavour from the deployment flavours of the NSD based on the identifier or identifiers (VNFa, VNFb, VNFc, and VNFd) of the one or more VNFs included in the NSD, the connection relationship between the plurality of VNFs included in the NSD (the VNFa is connected to the VNFb and the VNFd, the VNFb is connected to the VNFc, and the VNFc is connected to the VNFd), and the attribute information of the connection between the plurality of VNFs included in the NSD (not shown) in the NFV deployment policy. For example, selected deployment flavours are an NSD DF-1 to an NSD DF-6. In this case, a plurality of deployment flavour may be selected from the deployment flavours of the NSD. Further, a final deployment flavour needs to be obtained with reference to a deployment flavour, of the VNFD, selected by the VNFM network element. Therefore, for ease of description, the deployment flavours selected in this case may be referred to as candidate deployment flavours.

In another possible embodiment, the NFVO may find, by filtering each parameter of a flavour key and flavour content in the deployment flavour of the NS, an NSD DF that satisfies the rule. For example, referring to FIG. 3, an NSD DF of a "service 1" satisfies [VNF-a in NS.elements_list] and [VNF-d in NS.elements_list] and [VL.connection= (VNF-a.CP2, VNF-d.CP1)], and therefore the NFVO may select a deployment flavour of the NS as a candidate deployment flavour.

Further, step 605 further includes the following steps: Step 605*b*. The NFVO network element sends, to the VNFM network element, the rule (namely, the VNF deployment policy) that needs to be satisfied by each parameter in the VNFD used by each of the one or more VNFs included in the NSD. Step 605*c*. The VNFM network element selects, based on the rule that needs to be satisfied by each parameter in the VNFD used by each VNF and from the deployment flavour of the VNFD used by each VNF, the deployment flavour that satisfies the rule.

An attribute such as a VNF version, a service function, or performance, types of included VNFCs, and a quantity of corresponding VDUs may be described in the deployment flavour of each VNFD. In another possible embodiment, another possible attribute may be further described in the deployment flavour of each VNFD. This is not specifically limited.

For each VNF, the VNFM network element may select, by filtering each parameter of a flavour key and flavour content in the deployment flavour of the VNFD used by the VNF, a deployment flavour that is of the VNFD and that satisfies the rule. For example, if a flavour-d of the VNF-d can satisfy [LB_VDU.instace_number>=2] and [UP_VDU.instace_number>=4], the flavour-d is selected. For another example, if a flavour-x of the VNF-a can satisfy a rule that needs to be satisfied by each parameter in a VNFD used by the VNF-a, the flavour-x is selected. For another example, if a flavour-m of the VNF-b can satisfy a rule that needs to be satisfied by each parameter in a VNFD used by the VNF-b, the flavour-m is selected. In this way, the deployment flavour of the VNFD of each VNF can be selected.

It should be noted that, for a VNF, if two or more deployment flavours of the VNFD satisfy the rule, the VNFM network element may select a foremost deployment flavour based on an order of the deployment flavours of the VNFD. If a deployment flavour that is of the VNFD and that satisfies the rule cannot be selected, the VNFM network element may use a default deployment flavour (default DF).

Step 606. The VNFM network element sends the selected deployment flavour of the VNFD used by each VNF to the NFVO network element.

In this embodiment of this application, the NFVO network element may first request the VNFM network element to select the deployment flavour of the VNFD used by each VNF. Then, the VNFM network element sends the selected deployment flavour of the VNFD used by each VNF to the NFVO network element based on the request of the NFVO network element.

Step 607. The NFVO network element determines a final deployment flavour based on the candidate deployment flavour selected in step 605*a* and the deployment flavour that is of the VNFD used by each VNF and that is selected by the VNFM network element. Additionally, the NFVO network element deploys the NSI based on the determined deployment flavour.

For example, the candidate deployment flavours selected in step 605*a* are the NSD DF-1 to the NSD DF-6, and deployment flavours, of VNFDs used by VNFs, selected by the VNFM network element are the flavour-x, the flavour-m, a flavour-c, and a flavour-d, thereby determining that the final deployment flavour is the NSD DF-1.

Herein, if each VNF has only one deployment flavour, the NFVO network element may deploy the NSI directly based on the selected candidate deployment flavour. In this case, if two or more candidate deployment flavours are selected, one of the candidate deployment flavours may be selected based on priorities (where a default deployment flavour has a highest priority) or an order of the deployment flavours, and the NSI is deployed based on the selected deployment flavour.

A deployment process may be as follows. The NFVO network element instructs, based on a result (namely, the selected deployment flavour of the VNFD used by each VNF) returned by the VNFM, a VIM network element to perform virtual resource allocation and NFV deployment on an NFVI. For the process, refer to other approaches. Details are not described herein.

In another possible embodiment, after selecting the deployment flavour of the VNFD used by each VNF, the VNFM network element may no longer send the deployment flavour to the NFVO network element. Instead, the VNFM network element directly instructs the VIM network element to perform virtual resource allocation and NFV deployment on the NFVI based on the deployment flavour. A specific deployment manner is not limited in this embodiment of this application.

It should be noted that, in the foregoing descriptions, the rule that needs to be satisfied for the network service instantiation includes the identifier or identifiers of the one or more VNFs included in the NSD, the connection relationship between the plurality of VNFs included in the NSD, the attribute information of the connection between the plurality of VNFs included in the NSD, and the rule that needs to be satisfied by each parameter in the VNFD used by each of the one or more VNFs included in the NSD. In another possible embodiment, alternatively, the rule that needs to be satisfied for the network service instantiation may include only some of the foregoing information.

For example, the NSD that needs to be used when the NFV deployment of the NSI is performed has two deployment flavours, as shown in FIG. 3 (where it is assumed that each VNF included in the NSD includes only one deployment flavour). Identifiers of VNFs included in the two deployment flavours are different. To be more specific, a first deployment flavour does not include a VNFe, but a second deployment flavour includes a VNFe. Therefore, the two deployment flavours may be distinguished based on the identifiers of the VNFs. In this case, the rule that needs to be satisfied for the network service instantiation needs to include only the NSD that needs to be used when the NFV deployment of the NSI is performed or the identifier of the NSD, and the identifier or identifiers of the one or more VNFs included in the NSD. The NFVO network element may obtain the two deployment flavours of the NSD based on the NSD that needs to be used when the NFV deployment of the NSI is performed or the identifier of the NSD. The NFVO then selects, from the two deployment flavours based on the identifier or identifiers of the one or more VNFs included in the NSD, a deployment flavour that satisfies the rule. For example, the identifier or identifiers of the one or more VNFs included in the NSD do not include the VNFe, and therefore the first deployment flavour may be used as the deployment flavour that satisfies the rule. In this case, because each VNF included in the NSD includes only one deployment flavour, the rule that needs to be satisfied for the network service instantiation does not need to include the rule that needs to be satisfied by each parameter in the VNFD used by each of the one or more VNFs included in the NSD, and the process of selecting the deployment flavour of the VNFD does not need to be performed either.

In this way, in this embodiment of this application, there may be a plurality of possibilities for content included in the rule that needs to be satisfied for the network service instantiation. This is not specifically limited.

It can be understood that, the rule that needs to be satisfied for the network service instantiation is obtained based on the network function information corresponding to the service requirement. In other words, the identifier or identifiers of the one or more VNFs included in the NSD is or are obtained based on the one or more network functions corresponding to the service requirement, the connection relationship between the plurality of VNFs included in the NSD is obtained based on the connection relationship between the plurality of network functions corresponding to the service requirement, the attribute information of the connection between the plurality of VNFs included in the NSD is obtained based on the attribute information of the connection between the plurality of network functions corresponding to the service requirement, and the rule that needs to be satisfied by each parameter in the VNFD used by each of the one or more VNFs included in the NSD is obtained based on the requirement or requirements of the one or more network functions corresponding to the service requirement. Therefore, there may also be a plurality of possibilities for content included in the network function information corresponding to the service requirement. In implementation, the content included in the network function information corresponding to the service requirement may be more than or equal to the content included in the rule that needs to be satisfied for the network service instantiation.

In an example 1, the network function information corresponding to the service requirement includes only the one or more network functions corresponding to the service requirement. In this case, the correspondingly obtained rule that needs to be satisfied for the network service instantiation also includes only the identifier or identifiers of the one or more VNFs included in the NSD.

In an example 2, the network function information corresponding to the service requirement includes the plurality of network functions corresponding to the service requirement and the connection relationship between the plurality of network functions. In this case, the correspondingly obtained rule that needs to be satisfied for the network service instantiation may include only the identifiers of the plurality of VNFs included in the NSD, or may include the identifiers of the plurality of VNFs included in the NSD and the connection relationship between the plurality of VNFs.

Various possible cases derived from this embodiment of this application may be appropriately set by a person skilled in the art based on actual situations during implementation.

It can be learned from the foregoing content that the NSMF network element generates the NFV deployment policy based on the network slice requirement information, and sends the NFV deployment policy to the policy function network element. As such, the policy function network element can select a deployment flavour based on the NFV deployment policy. In comparison with other approaches in which a deployment flavour meeting a customer order needs to be selected directly from all the deployment flavours of the NSD that are listed in an NST, in the foregoing manner, it is unnecessary to map all the deployment flavours of the NSD in the NST to parameter combinations in the customer order. In this way, the NST is decoupled from a deployment flavour of the NSD and a deployment flavour of the VNFD, thereby greatly simplifying a design of the NST and reducing maintenance difficulty.

It should be noted that, for the content in the NST, the one or more network functions corresponding to the service requirement may be alternatively in a form of a network function set, for example, a next-generation radio access technology (NG-RAN) or a 5th generation core (5GC) network. In this case, for example, content included in the NST is the NSD corresponding to the service requirement or the identifier of the NSD, one or more network function sets corresponding to the service requirement, a connection relationship between a plurality of network function sets corresponding to the service requirement, attribute information of a connection between a plurality of network function sets corresponding to the service requirement, or a requirement or requirements of one or more network function sets corresponding to the service requirement.

Correspondingly, based on the content included in the NST, the NSMF network element may be configured to: obtain, based on the one or more network function sets corresponding to the service requirement, an identifier of a nested NSD included in the NSD and required for deploying the network function set or the network function sets; obtain, based on the connection relationship between the network function sets corresponding to the service requirement, a connection relationship between nested NS instances that are deployed after network service instantiation is performed based on the nested NSD included in the NSD or a connection relationship between other VNF instances; obtain, based on the attribute information of the connection between the plurality of network function sets corresponding to the service requirement, attribute information of a connection between the nested NS instances that are deployed after the network service instantiation is performed based on the nested NSD included in the NSDs or attribute information of a connection between the other VNFs; or obtain, based on the requirement or requirements of the one or more network function sets corresponding to the service requirement, a function feature that a nested NS instance needs to have, a quantity of included VNFs, a performance indicator parameter, an assurance parameter, a resource requirement, and the like.

In Embodiment 1, the NSMF network element may directly manage an NF. That is, the NSMF network element may have a related function of the NFMF network element. In this case, the NFMF network element does not need to be separately disposed. It may be understood that, the NSMF network element may alternatively not have the related function of the NFMF network element. In this case, the NFMF network element needs to be disposed independently. The following provides descriptions with reference to Embodiment 2.

Embodiment 2

Figure 7A:
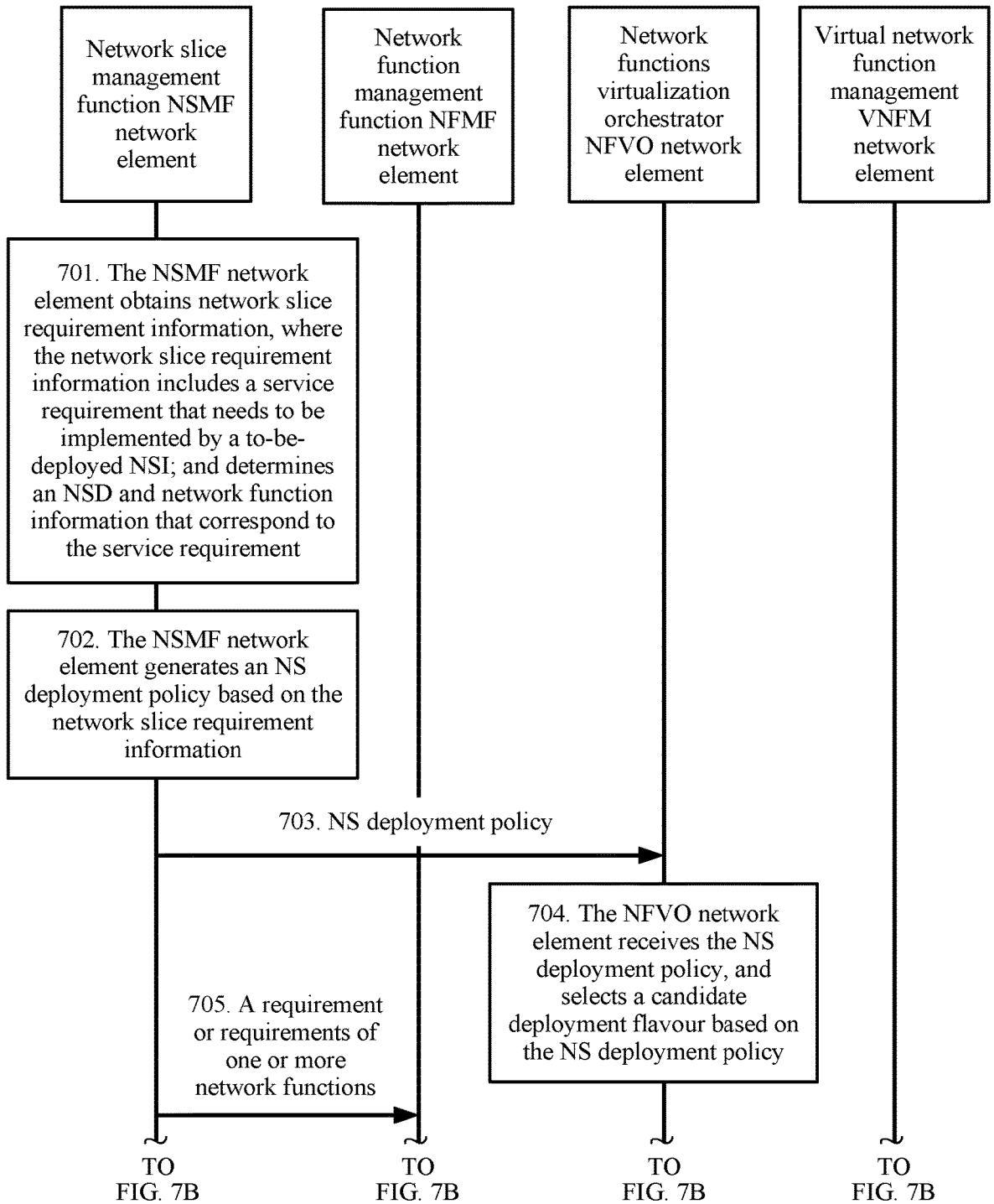
FIG. 7A and FIG. 7B are schematic flowcharts corresponding to a network slice deployment method according to Embodiment 2 of this application.
Figure 7B:
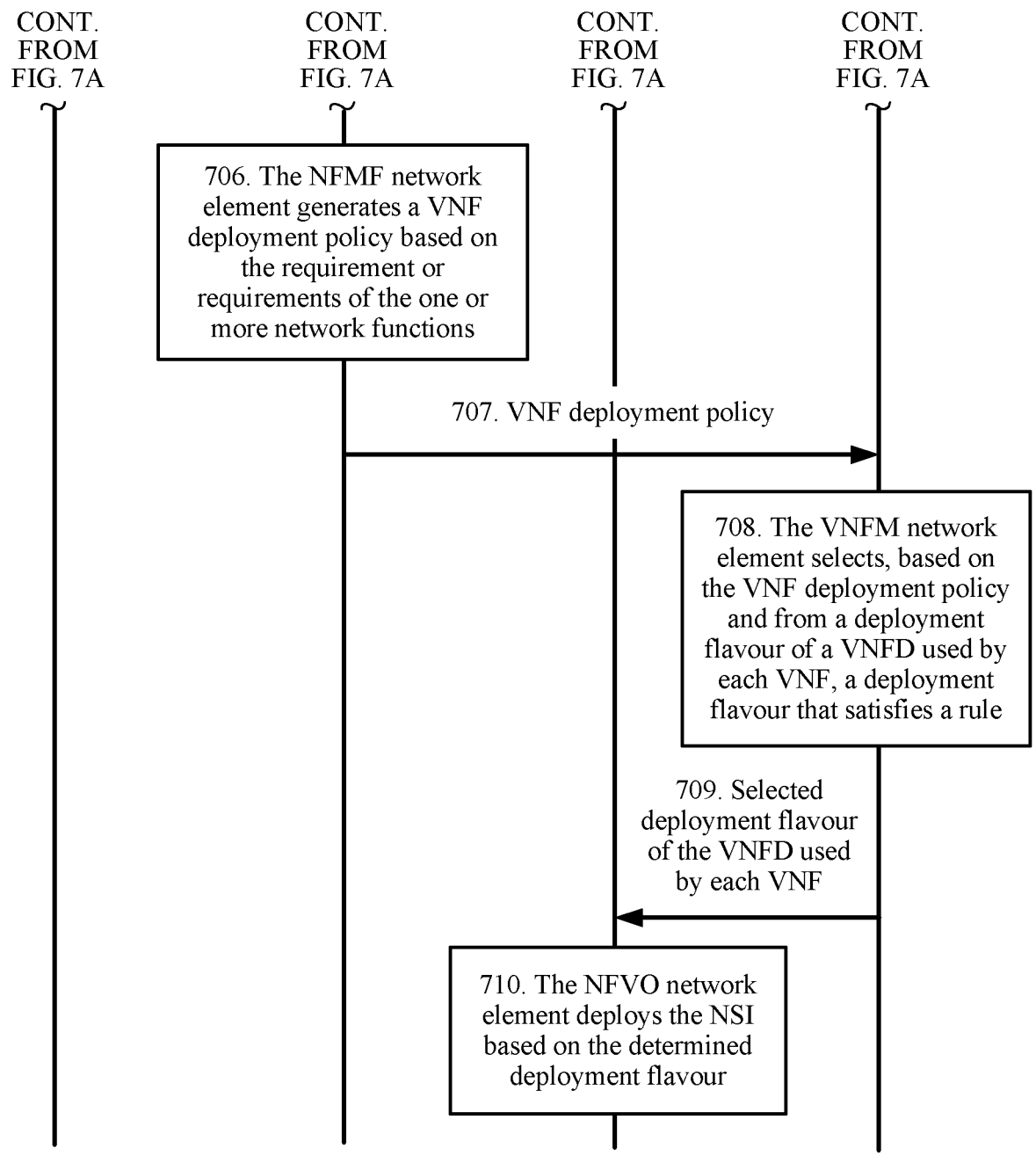

FIG. 7A and FIG. 7B are schematic flowcharts corresponding to a network slice deployment method according to Embodiment 2 of this application. As shown in FIG. 7A and FIG. 7B, the method includes the following steps.

Step 701. An NSMF network element obtains network slice requirement information, where the network slice requirement information includes a service requirement that needs to be implemented by a to-be-deployed NSI. Additionally, the NSMF network element determines an NSD and network function information that correspond to the service requirement, where the network function information includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement.

Step 702. The NSMF network element generates an NS deployment policy, where the NS deployment policy includes the NSD corresponding to the service requirement or an identifier of the NSD, and any one or a combination of the following: an identifier or identifiers of one or more virtualized network functions VNFs included in the NSD, a connection relationship between a plurality of VNFs included in the NSD, or attribute information of a connection between the plurality of VNFs included in the NSD.

Step 703. The NSMF network element sends the NS deployment policy to an NFVO network element.

Step 704. The NFVO network element receives the NS deployment policy, and selects a candidate deployment flavour based on the NS deployment policy.

If the network function information includes the requirement or requirements of the one or more network functions, the NSMF network element may further perform step 705.

Step 705. The NSMF network element sends the requirement or requirements of the one or more network functions corresponding to the service requirement to an NFMF network element.

Herein, the requirement or requirements of the one or more network functions is or are the requirement or requirements, of the one or more network functions corresponding to the service requirement that needs to be implemented by the NSI, obtained by the NSMF network element based on the network slice requirement information. For example, in the example described in Embodiment 1: a communication service is provided for 20000 shared bicycles in a particular region, a requirement of a network function corresponding to the service requirement is [VNF-d.max_session>=20000].

Step 706. The NFMF network element receives the requirement or requirements of the one or more network functions. Additionally, the NFMF network element generates, based on the requirement or requirements of the one or more network functions, a rule (namely, a VNF deployment policy) that needs to be satisfied by each parameter in a VNFD used by each of the one or more VNFs.

For example, the NFMF network element may determine, based on the requirement or requirements of the one or more network functions and an implementation specification of a network function in an NST, a rule that needs to be satisfied by each parameter in a VNFD used for deploying a corresponding VNF. Additionally, the NFMF network element may generate a deployment policy of the VNF. The implementation specification of the network function in the NST may be obtained based on an actual specification of a network function of each vendor.

For example, the NFMF network element may determine, based on a service function requirement, a version number of the VNF, included VNF components (VNFCs), and virtualization deployment units (VDUs) corresponding to these VNFCs. The NFMF network element may further determine a quantity of VDUs in the VNF and the like based on a requirement of the NF. In the foregoing example, based on a service performance specification of the VNF-d and an actual specification of a network function of a vendor, the NFMF converts a requirement of [VNF-d.max_session>=20000] into [LB_VDU.instace_number>=2] and [UP_VDU.instace_number>=4], and uses [LB_VDU.instace_number>=2] and [UP_VDU.instace_number>=4] as a VNF deployment policy.

Step 707. The NFMF network element sends the VNF deployment policy to a VNFM network element, where the VNF deployment policy includes the rule that needs to be satisfied by each parameter in the VNFD used by each of the one or more VNFs.

Herein, if a unified VNFD is used for VNFs corresponding to all network functions, and an attribute difference and even a vendor difference are described in a form of deployment flavours of different VNFDs, an identifier of the unified VNFD may be preconfigured on the NFMF network element. In this way, a message sent by the NFMF network element to the VNFM may further carry the identifier of the VNFD.

Step 708. The VNFM network element selects, based on the rule that needs to be satisfied by each parameter in the VNFD used by each VNF and from a deployment flavour of the VNFD used by each VNF, a deployment flavour that is of the VNFD and that satisfies the rule.

For example, the VNFM network element may select, by filtering each parameter of a flavour key and flavour content in the deployment flavour of the VNFD, the deployment flavour that is of the VNFD and that satisfies the rule.

Step 709. The VNFM network element sends the selected deployment flavour of the VNFD used by each VNF to the NFVO network element.

Step 710. The NFVO network element determines a final deployment flavour based on the candidate deployment flavour and the deployment flavour that is of the VNFD used by each VNF and that is selected by the VNFM network element. Additionally, the NFVO network element deploys the NSI based on the determined deployment flavour.

It should be noted that, differences between Embodiment 2 and Embodiment 1 are as follows. In Embodiment 1, the NSMF network element performs the related function of the NFMF network element, whereas in Embodiment 2, the NFMF network element independently performs the related function. For content other than the differences, mutual reference may be made between Embodiment 2 and Embodiment 1.

Embodiment 3

Figure 8:
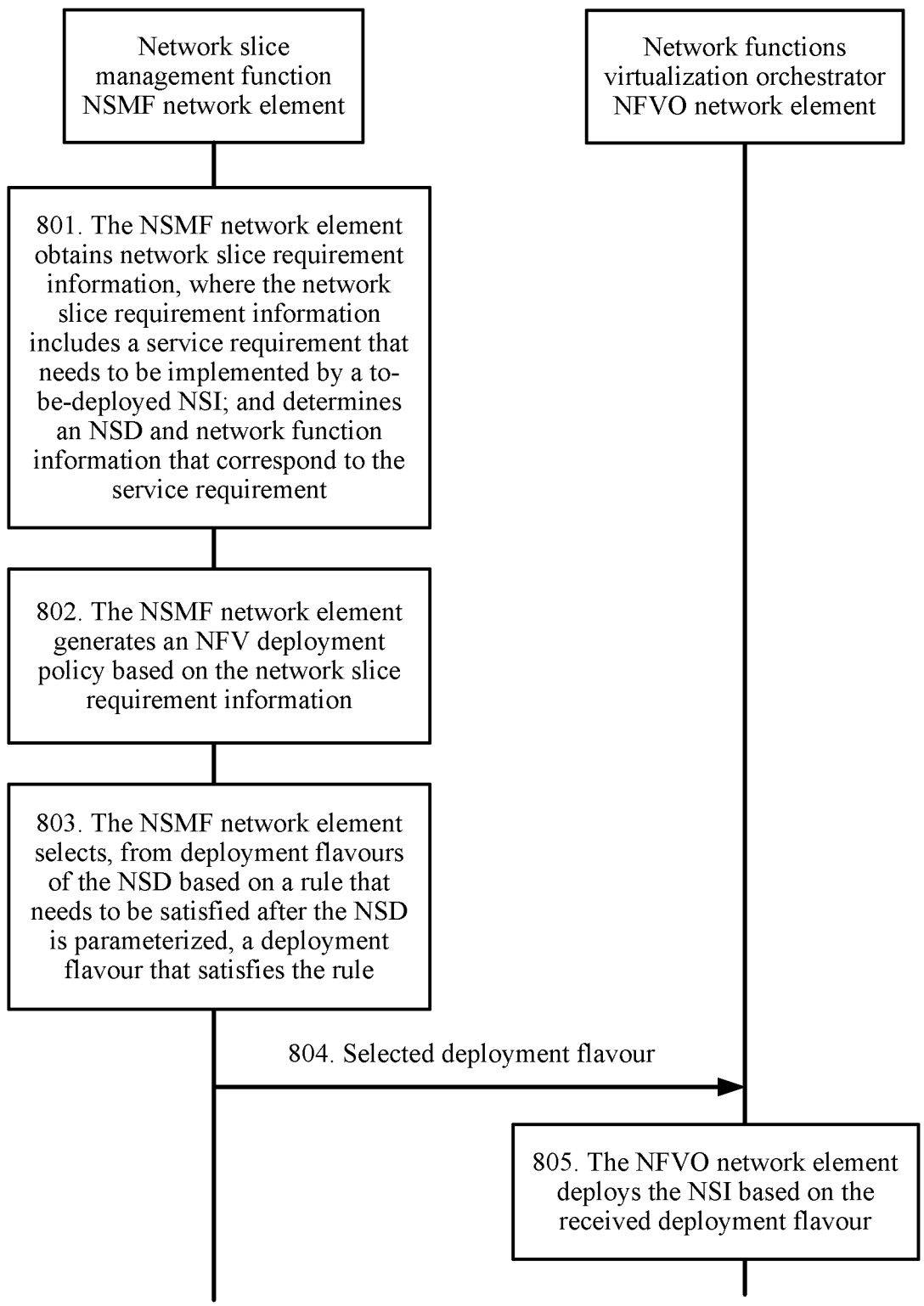
FIG. 8 is a schematic flowchart corresponding to a network slice deployment method according to Embodiment 3 of this application.

FIG. 8 is a schematic flowchart corresponding to a network slice deployment method according to Embodiment 3 of this application. As shown in FIG. 8, the method includes the following steps.

Step 801. An NSMF network element obtains network slice requirement information, where the network slice requirement information includes a service requirement that needs to be implemented by a to-be-deployed NSI. Additionally, the NSMF network element determines an NSD and network function information that correspond to the service requirement. The network function information corresponding to the service requirement includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement.

Step 802. The NSMF network element generates an NFV deployment policy, where the NFV deployment policy includes the NSD corresponding to the service requirement or an identifier of the NSD, and a rule that needs to be satisfied for performing network service instantiation based on the NSD. The rule that needs to be satisfied for the network service instantiation includes any one or a combination of the following: an identifier or identifiers of one or more virtualized network functions VNFs included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD.

Step 803. The NSMF network element selects, from deployment flavours of the NSD based on the rule that needs to be satisfied for the network service instantiation, a deployment flavour that satisfies the rule.

For example, the NSMF network element may select a candidate deployment flavour from the deployment flavours of the NSD based on an NS deployment policy, and select, based on a VNF deployment policy and from a deployment flavour of the VNFD used by each VNF, the deployment flavour that satisfies the rule. For example, selected candidate deployment flavours are an NSD DF-1 to an NSD DF-6, and selected deployment flavours of the VNFDs used by the VNFs are a flavour-x, a flavour-m, a flavour-c, and a flavour-d, and therefore the NSMF network element may determine that the deployment flavour that satisfies the rule that needs to be satisfied for the network service instantiation is the NSD DF-1.

Step 804. The NSMF network element sends the selected deployment flavour to an NFVO network element.

Step 805. The NFVO network element deploys the NSI based on the received deployment flavour.

It should be noted that, differences between Embodiment 3 and Embodiment 1 are as follows. In Embodiment 1, after generating the NFV deployment policy, the NSMF network element sends the NFV deployment policy to the NFVO network element; the NFVO network element selects the candidate deployment flavour; the VNFM network element selects the deployment flavour of the VNFD; and the NSI is deployed based on the selected candidate deployment flavour and the selected deployment flavour of the VNFD. In Embodiment 3, however, after the NSMF network element generates the NFV deployment policy, the NSMF network element directly selects, from the deployment flavours of the NSD based on the NFV deployment policy, the deployment flavour that satisfies the rule, and further sends the selected deployment flavour to the NFVO network element to deploy the NSI. For content other than the differences, mutual reference may be made between Embodiment 3 and Embodiment 1.

Embodiment 4

Figure 9A:
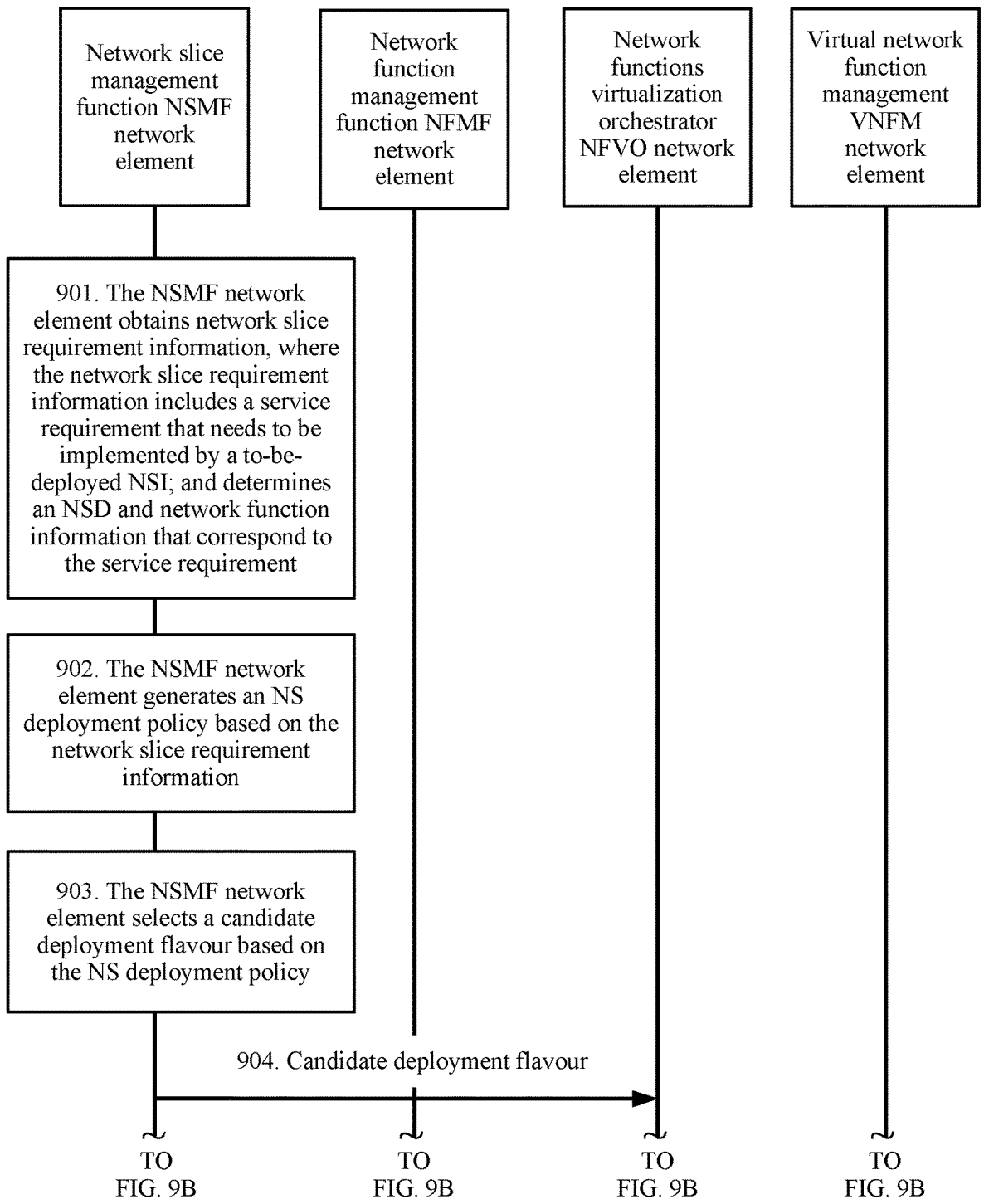
FIG. 9A and FIG. 9B are schematic flowcharts corresponding to a network slice deployment method according to Embodiment 4 of this application.
Figure 9B:
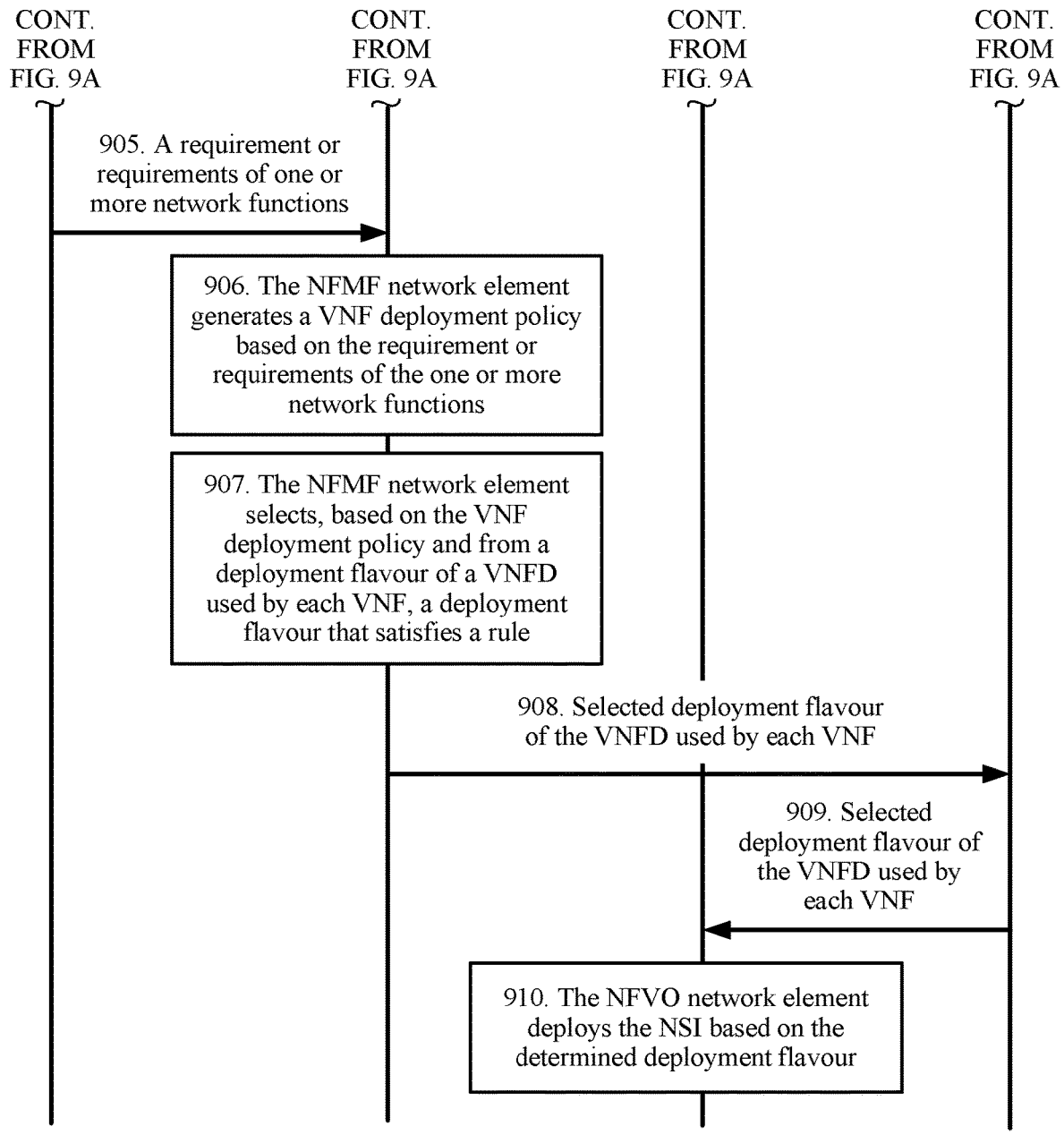

FIG. 9A and FIG. 9B are schematic flowcharts corresponding to a network slice deployment method according to Embodiment 4 of this application. As shown in FIG. 9A and FIG. 9B, the method includes the following steps.

Step 901. An NSMF network element obtains network slice requirement information, where the network slice requirement information includes a service requirement that needs to be implemented by a to-be-deployed NSI. Additionally, the NSMF network element determines an NSD and network function information that correspond to the service requirement. The network function information includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement.

Step 902. The NSMF network element generates an NS deployment policy. The NS deployment policy includes the NSD corresponding to the service requirement or an identifier of the NSD, and any one or a combination of the following: an identifier or identifiers of one or more virtualized network functions VNFs included in the NSD, a connection relationship between a plurality of VNFs included in the NSD, or attribute information of a connection between the plurality of VNFs included in the NSD.

Step 903. The NSMF network element selects a candidate deployment flavour based on the NS deployment policy.

Step 904. The NSMF network element sends the selected candidate deployment flavour to an NFVO network element.

If the network function information includes the requirement or requirements of the one or more network functions, the NSMF network element may further perform step 905.

Step 905. The NSMF network element sends the requirement or requirements of the one or more network functions corresponding to the service requirement to an NFMF network element.

Step 906. The NFMF network element generates, based on the requirement or requirements of the one or more network functions, a rule that needs to be satisfied by each parameter in a VNFD used by each of the one or more VNFs.

Step 907. The NFMF network element selects, based on the rule that needs to be satisfied by each parameter in the VNFD used by each VNF and from a deployment flavour of the VNFD used by each VNF, a deployment flavour that satisfies the rule that needs to be satisfied by each parameter in the VNFD used by each VNF.

Step 908. The NFMF network element sends the selected deployment flavour of the VNFD to a VNFM network element.

Step 909. The VNFM network element sends the selected deployment flavour of the VNFD to the NFVO network element.

Step 910. The NFVO network element determines a final deployment flavour based on the candidate deployment flavour and the deployment flavour of the VNFD that is selected by the VNFM network element. Additionally, the NFVO network element deploys the NSI based on the determined deployment flavour.

It should be noted that, differences between Embodiment 4 and Embodiment 2 are as follows. In Embodiment 2, after the NSMF network element generates the NS deployment policy, the NSMF network element sends the NS deployment policy to the NFVO network element; the NFVO network element selects the candidate deployment flavour from the deployment flavours of the NSD based on the NS deployment policy; the NFMF network element sends the VNF deployment policy to the VNFM network element; and the VNFM network element selects the deployment flavour of the VNFD based on the VNF deployment policy. In Embodiment 4, however, after the NSMF network element generates the NS deployment policy, the NSMF network element directly selects the candidate deployment flavour from the deployment flavours of the NSD based on the NS deployment policy; and after the NFMF network element generates the VNF deployment policy, the NFMF network element directly selects the deployment flavour of the VNFD based on the VNF deployment policy. For content other than the differences, mutual reference may be made between Embodiment 4 and Embodiment 2.

For the foregoing method processes, the embodiments of this application further provide an NSMF network element and a policy function network element. For implementations of the NSMF network element and the policy function network element, refer to the foregoing method processes.

Figure 10:
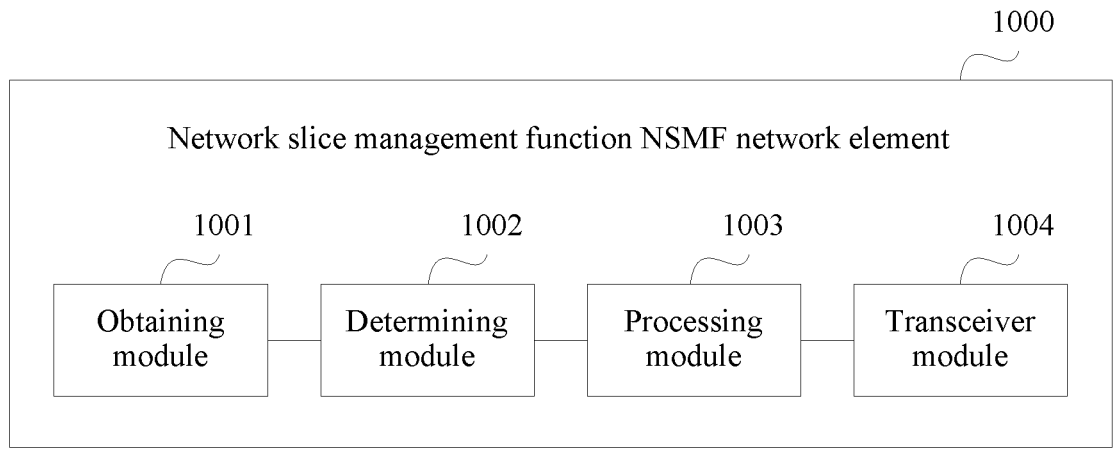
FIG. 10 is a schematic structural diagram of an NSMF network element according to an embodiment of this application.

FIG. 10 is a schematic structural diagram of an NSMF network element 1000 according to an embodiment of this application. The NSMF network element 1000 may be configured to implement corresponding processes in FIG. 6A and FIG. 6B to FIG. 9A and FIG. 9B. The NSMF network element 1000 includes: an obtaining module 1001 configured to obtain network slice requirement information, where the network slice requirement information includes a service requirement that needs to be implemented by a to-be-deployed network slice instance (NSI); a determining module 1002 configured to determine a network service deployment (NSD) template and network function information that correspond to the service requirement, where the network function information corresponding to the service requirement includes any one or a combination of the following: one or more network functions corresponding to the service requirement, a connection relationship between a plurality of network functions corresponding to the service requirement, attribute information of a connection between the plurality of network functions corresponding to the service requirement, or a requirement or requirements of the one or more network functions corresponding to the service requirement. The NSMF network element 1000 further includes a processing module 1003 configured to generate a network functions virtualization (NFV) deployment policy for performing NFV deployment of the NSI, where the NFV deployment policy includes the NSD corresponding to the service requirement or an identifier of the NSD, and a rule that needs to be satisfied for performing network service instantiation based on the NSD. The rule that needs to be satisfied for the network service instantiation includes any one or a combination of the following: an identifier or identifiers of one or more virtualized network functions VNFs included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD.

In a possible design, the determining module 1002 is configured to determine a network slice template (NST) matching the service requirement. The NST includes the NSD corresponding to the service requirement or the identifier of the NSD, and the network function information corresponding to the service requirement.

In a possible design, the identifier or identifiers of the one or more VNFs included in the NSD is or are obtained based on the one or more network functions corresponding to the service requirement, the connection relationship between the plurality of VNFs included in the NSD is obtained based on the connection relationship between the plurality of network functions corresponding to the service requirement, the attribute information of the connection between the plurality of VNFs included in the NSD is obtained based on the attribute information of the connection between the plurality of network functions corresponding to the service requirement, and the rule that needs to be satisfied by each parameter in the VNFD used by each of the one or more VNFs included in the NSD is obtained based on the requirement or requirements of the one or more network functions corresponding to the service requirement.

In a possible design, the NSMF network element further includes a transceiver module 1004. The transceiver module 1004 is configured to send the requirement or requirements of the one or more network functions corresponding to the service requirement to a network function management function (NFMF) network element.

In a possible design, the processing module 1003 is further configured to: obtain, based on the NSD corresponding to the service requirement or the identifier of the NSD, deployment flavours of the NSD; and select, from the deployment flavours of the NSD based on the rule that needs to be satisfied for the network service instantiation, a deployment flavour that satisfies the rule that needs to be satisfied for the network service instantiation.

In a possible design, the NSMF network element further includes a transceiver module 1004. The transceiver module 1004 is configured to send the NFV deployment policy to a policy function network element.

Figure 11:
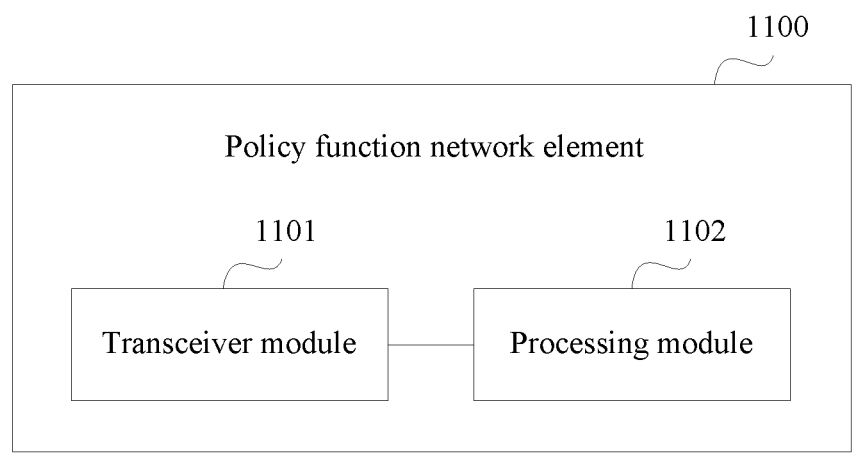
FIG. 11 is a schematic structural diagram of a policy function network element according to an embodiment of this application.

FIG. 11 is a schematic structural diagram of a policy function network element according to an embodiment of this application. The policy function network element may be configured to implement corresponding processes in FIG. 6A and FIG. 6B to FIG. 9A and FIG. 9B. The policy function network element 1100 includes: a transceiver module 1101 configured to receive an NFV deployment policy sent by an NSMF network element, where the NFV deployment policy includes an NSD or an identifier of the NSD, and a rule that needs to be satisfied for performing network service instantiation based on the NSD. The rule that needs to be satisfied for the network service instantiation includes any one or a combination of the following: an identifier or identifiers of one or more virtualized network functions VNFs included in the NSD, a connection relationship between a plurality of VNFs included in the NSD, attribute information of a connection between the plurality of VNFs included in the NSD, or a rule that needs to be satisfied by each parameter in a VNFD used by each of the one or more VNFs included in the NSD. The policy function network element 1100 further includes a processing module 1102 configured to: obtain deployment flavours of the NSD based on the NSD or the identifier of the NSD; and select, from the deployment flavours of the NSD based on the rule that needs to be satisfied for the network service instantiation, a deployment flavour that satisfies the rule.

It should be noted that, in this embodiment of this application, unit division is an example, and is merely a logical function division. In actual implementation, another division manner may be used. Function units in the embodiments of this application may be integrated into one processing unit, or each of the units may exist alone physically, or two or more units may be integrated into one unit. The integrated unit may be implemented in a form of hardware, or may be implemented in a form of a software function unit.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on a computer, the processes or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

These computer program instructions may be stored in a computer readable memory that can instruct the computer or another programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

A person skilled in the art can make various modifications and variations to the embodiments of this application without departing from the spirit and scope of this application. Therefore, this application is intended to cover these modifications and variations to the embodiments of this application provided that they fall within the scope of the claims of this application and their equivalent technologies.

What is claimed is:

1. A network slice deployment method, comprising: obtaining network slice subnet requirement information, wherein the network slice subnet requirement information comprises a service requirement that needs to be implemented by a to-be-deployed network slice subnet instance (NSSI); determining an identifier of a network service descriptor (NSD) corresponding to the service requirement and network function information corresponding to the service requirement, wherein the network function information comprises at least one of: a network function corresponding to the service requirement, a connection relationship between a plurality of network functions corresponding to the service requirement, attribute information of a connection between the plurality of network functions, or a requirement of the network function corresponding to the service requirement; and generating a network functions virtualization (NFV) deployment policy for performing NFV deployment of the NSI, wherein the NFV deployment policy comprises a rule and either the NSD or the identifier of the NSD, wherein the rule needs to be satisfied for performing network service instantiation based on the NSD, and wherein the rule comprises at least one of: an identifier of one or more virtualized network functions (VNFs) in the NSD, a second connection relationship between a plurality of VNFs in the NSD, second attribute information of a second connection between the plurality of VNFs in the NSD, or a second rule that needs to be satisfied by each parameter in a VNF descriptor (VNFD) used by each of the one or more VNFs in the NSD.

2. The network slice deployment method according to claim 1, wherein determining the identifier of the NSD and the network function information comprises determining a network slice template (NST) matching the service requirement, wherein the NST comprises the network function information corresponding to the service requirement and either the NSD or the identifier of the NSD.

3. The network slice deployment method according to claim 1, wherein the identifier of the one or more VNFs is obtained based on the network function corresponding to the service requirement, wherein the second connection relationship between the plurality of VNFs is obtained based on the connection relationship between the plurality of network functions, wherein the second attribute information of the second connection is obtained based on the attribute information of the connection between the plurality of network functions, and wherein the second rule is obtained based on the requirement of the network function corresponding to the service requirement.

4. The network slice deployment method according to claim 1, further comprising sending the requirement of the one or more network functions to a network function management function (NFMF) network element.

5. The network slice deployment method according to claim 1, wherein after generating the NFV deployment policy, the method further comprises: obtaining, based on the NSD or the identifier of the NSD, deployment flavours of the NSD; and selecting, from the deployment flavours of the NSD, a deployment flavour that satisfies the rule.

6. The network slice deployment method according to claim 1, further comprising sending, after generating the NFV deployment policy, the NFV deployment policy to a policy function network element.

7. A network slice deployment method, comprising: receiving a network functions virtualization (NFV) deployment policy from a network slice subnet management function (NSSMF) network element, wherein the NFV deployment policy comprises a rule and either a network service descriptor (NSD) or an identifier of the NSD, wherein the rule needs to be satisfied for performing network service instantiation based on the NSD, and wherein the rule comprises at least one of: an identifier of one or more virtualized network functions (VNFs) in the NSD, a connection relationship between a plurality of VNFs in the NSD, attribute information of a connection between the plurality of VNFs in the NSD, or a second rule that needs to be satisfied by each parameter in a VNF descriptor (VNFD) used by each of the one or more VNFs in the NSD; obtaining deployment flavours of the NSD based on the NSD or the identifier of the NSD; and selecting, from the deployment flavours of the NSD, a deployment flavour that satisfies the rule that needs to be satisfied for the network service instantiation.

8. A network slice subnet management function (NSSMF) network element, comprising: a transceiver configured to obtain network slice subnet requirement information, wherein the network slice subnet requirement information comprises a service requirement that needs to be implemented by a to-be-deployed network slice subnet instance (NSSI); a processor configured to: determine an identifier of a network service descriptor (NSD) corresponding to the service requirement and network function information corresponding to the service requirement, wherein the network function information comprises at least one of: one or more network functions corresponding to the service requirement, a connection relationship between a plurality of network functions corresponding to the service requirement, attribute information of a connection between the plurality of network functions, or a requirement of the one or more network functions corresponding to the service requirement; and generate a network functions virtualization (NFV) deployment policy for performing NFV deployment of the NSSI, wherein the NFV deployment policy comprises a rule and either the NSD or the identifier of the NSD, wherein the rule needs to be satisfied for performing network service instantiation based on the NSD, and wherein the rule comprises at least one of: an identifier of one or more virtualized network functions (VNFs) in the NSD, a second connection relationship between a plurality of VNFs comprised in the NSD, second attribute information of a second connection between the plurality of VNFs in the NSD, or a second rule that needs to be satisfied by each parameter in a VNF descriptor (VNFD) used by each of the one or more VNFs in the NSD.

9. The NSSMF network element according to claim 8, wherein the processor is configured to determine a network slice template (NST) matching the service requirement, wherein the NST comprises the network function information corresponding to the service requirement and either the NSD or the identifier of the NSD.

10. The NSSMF network element according to claim 8, wherein the identifier of the one or more VNFs is obtained based on the one or more network functions corresponding to the service requirement, wherein the second connection relationship between the plurality of VNFs is obtained based on the connection relationship between the plurality of network functions, wherein the second attribute information of the second connection is obtained based on the attribute information of the connection between the plurality of network functions, and wherein the second rule that needs to be satisfied by each parameter is obtained based on the requirement of the one or more network functions.

11. The NSSMF network element according to claim 8, wherein the transceiver configured to send the requirement of the one or more network functions to a network function management function (NFMF) network element.

12. The NSSMF network element according to claim 8, wherein the processor is further configured to: obtain, based on the NSD or the identifier of the NSD, deployment flavours of the NSD; and select, from the deployment flavours of the NSD, a deployment flavour that satisfies the rule that needs to be satisfied for the network service instantiation.

13. The NSSMF network element according to claim 8, wherein the transceiver is configured to send the NFV deployment policy to a policy function network element.

14. A policy function network element, comprising: a transceiver configured to receive a network functions virtualization (NFV) deployment policy from a network slice subnet management function (NSSMF) network element, wherein the NFV deployment policy comprises a rule and a network service descriptor (NSD) or an identifier of the NSD, wherein the rule needs to be satisfied for performing network service instantiation based on the NSD, and wherein the rule comprises at least one of: an identifier of one or more virtualized network functions (VNFs) in the NSD, a connection relationship between a plurality of VNFs in the NSD, attribute information of a connection between the plurality of VNFs in the NSD, or a second rule that needs to be satisfied by each parameter in a VNF descriptor (VNFD) used by each of the one or more VNFs in the NSD; and a processor configured to: obtain deployment flavours of the NSD based on the NSD or the identifier of the NSD; and select, from the deployment flavours of the NSD, a deployment flavour that satisfies the rule that needs to be satisfied for the network service instantiation.

15. A network slice subnet management function (NSSMF) network element, wherein the NSSMF network element comprises a memory configured to store a software program; and a processor configured to execute the software program to cause the NSSMF network element to: obtain network slice subnet requirement information, wherein the network slice subnet requirement information comprises a service requirement that needs to be implemented by a to-be-deployed network slice subnet instance (NSSI), determine an identifier of a network service descriptor (NSD) corresponding to the service requirement and network function information corresponding to the service requirement, wherein the network function information comprises at least one of: one or more network functions corresponding to the service requirement, a connection relationship between a plurality of network functions corresponding to the service requirement, attribute information of a connection between the plurality of network functions corresponding to the service requirement; or a requirement of the one or more network functions corresponding to the service requirement; and generate a network functions virtualization (NFV) deployment policy for performing NFV deployment of the NSSI, wherein the NFV deployment policy comprises a rule and either the NSD or the identifier of the NSD, wherein the rule needs to be satisfied for performing network service instantiation based on the NSD, and wherein the rule comprises at least one of: at least one identifier of one or more virtualized network functions (VNFs) in the NSD, a second connection relationship between a plurality of VNFs in the NSD, second attribute information of a second connection between the plurality of VNFs in the NSD, or a second rule that needs to be satisfied by each parameter in a VNF descriptor (VNFD) used by each of the one or more VNFs in the NSD.

16. A policy function network element, wherein the policy function network element comprises: a memory configured to store a software program; and a processor configured to execute the software program to cause the policy function network element to: receive a network functions virtualization (NFV) deployment policy from a network slice subnet management function (NSSMF) network element, wherein the NFV deployment policy comprises a rule and either a network service descriptor (NSD) or an identifier of the NSD, wherein the rule needs to be satisfied for performing network service instantiation based on the NSD, and wherein the rule comprises at least one of: an identifier of one or more virtualized network functions (VNFs) in the NSD, a connection relationship between a plurality of VNFs in the NSD, attribute information of a connection between the plurality of VNFs in the NSD, or a second rule that needs to be satisfied by each parameter in a VNF descriptor (VNFD) used by each of the one or more VNFs in the NSD; obtain deployment flavours of the NSD based on the NSD or the identifier of the NSD; and select, from the deployment flavours of the NSD, a deployment flavour that satisfies the rule that needs to be satisfied for the network service instantiation.

17. A non-transitory computer storage medium, wherein the storage medium stores a software program, which when executed by one or more processors, cause a network slice subnet management function (NSSMF) network element to implement a network slice deployment method comprising: obtaining network slice subnet requirement information, wherein the network slice subnet requirement information comprises a service requirement that needs to be implemented by a to-be-deployed network slice subnet instance (NSSI); determining an identifier of a network service descriptor (NSD) corresponding to the service requirement and network function information corresponding to the service requirement, wherein the network function information comprises at least one of: one or more network functions corresponding to the service requirement, a connection relationship between a plurality of network functions corresponding to the service requirement, attribute information of a connection between the plurality of network functions corresponding to the service requirement, or a requirement of the one or more network functions corresponding to the service requirement; and generating a network functions virtualization (NFV) deployment policy for performing NFV deployment of the NSSI, wherein the NFV deployment policy comprises a rule and either the NSD or the identifier of the NSD, wherein the rule needs to be satisfied for performing network service instantiation based on the NSD, and wherein the rule comprises at least one of: an identifier of one or more virtualized network functions (VNFs) in the NSD, a second connection relationship between a plurality of VNFs in the NSD, second attribute information of a second connection between the plurality of VNFs in the NSD, or a second rule that needs to be satisfied by each parameter in a VNF descriptor (VNFD) used by each of the one or more VNFs in the NSD.

18. A network functions virtualization (NFV) system, comprising: a network slice subnet management function (NSSMF) network element having a memory and a processor configured to: obtain network slice subnet requirement information, wherein the network slice subnet requirement information comprises a service requirement that needs to be implemented by a to-be-deployed network slice subnet instance (NSSI); determine an identifier of a network service descriptor (NSD) corresponding to the service requirement and network function information corresponding to the service requirement, wherein the network function information comprises at least one of: one or more network functions corresponding to the service requirement, a connection relationship between a plurality of network functions corresponding to the service requirement, attribute information of a connection between the plurality of network functions, and a requirement of the one or more network functions; generate a network functions virtualization (NFV) deployment policy for performing NFV deployment of the NSSI, wherein the NFV deployment policy comprises a rule and either the NSD or the identifier of the NSD, wherein the rule needs to be satisfied for performing network service instantiation based on the NSD, and wherein the rule comprises at least one of: an identifier of one or more virtualized network functions (VNFs) in the NSD, a second connection relationship between a plurality of VNFs in the NSD, second attribute information of a second connection between the plurality of VNFs, or a second rule that needs to be satisfied by each parameter in a VNF descriptor (VNFD) used by each of the one or more VNFs in the NSD; and send the NFV deployment policy; and a policy function network element configured to: receive the NFV deployment policy from the NSMF network element; obtain deployment flavours of the NSD based on the NSD or the identifier of the NSD; and select, from the deployment flavours of the NSD, a deployment flavour that satisfies the rule that needs to be satisfied for the network service instantiation.

19. The system according to claim 18, wherein that the NSSMF network element is configured to determine a network slice template (NST) matching the service requirement, wherein the NST comprises the network function information corresponding to the service requirement and either the NSD or the identifier of the NSD.

20. The system according to claim 18, wherein the identifier of the one or more VNFs is obtained based on the one or more network functions, wherein the second connection relationship between the plurality of VNFs is obtained based on the connection relationship between the plurality of network functions, wherein the second attribute information of the second connection between the plurality of VNFs is obtained based on the attribute information of the connection between the plurality of network functions, and wherein the second rule that needs to be satisfied by each parameter is obtained based on the requirement of the one or more network functions corresponding to the service requirement.

21. The system according to claim 18, wherein the NSSMF network element is further configured to send the requirement of the one or more network functions to a network function management function (NFMF) network element.

22. The system according to claim 18, wherein the NSSMF network element is further configured to: obtain, based on the NSD or the identifier of the NSD, deployment flavours of the NSD; and select, from the deployment flavours of the NSD, a deployment flavour that satisfies the rule that needs to be satisfied for the network service instantiation.

* * * * *

UNITED STATES PATENT AND TRADEMARK OFFICE
CERTIFICATE OF CORRECTION

PATENT NO. : 11,283,684 B2  
APPLICATION NO. : 16/901195  
DATED : March 22, 2022  
INVENTOR(S) : Zhuoming Li and Hongxing Wang Page 1 of 1

It is certified that error appears in the above-identified patent and that said Letters Patent is hereby corrected as shown below:

In the Claims

Claim 1, Column 34, Line 23: "the NSI, wherein" should read "the NSSI, wherein"

Claim 15, Column 36, Line 39: "comprises a memory" should read "comprises: a memory"

Claim 15, Column 36, Line 45: "(NSSI), determine" should read "(NSSI); determine"

Claim 15, Column 36, Line 55: "service requirement; or" should read "service requirement, or"

Claim 18, Column 38, Line 29: "NSMF network" should read "NSSMF network"

Signed and Sealed this  
Tenth Day of May, 2022

Katherine Kelly Vidal  
*Director of the United States Patent and Trademark Office*